(12) United States Patent
Ablov

(10) Patent No.: US 9,793,807 B2
(45) Date of Patent: Oct. 17, 2017

(54) LOSSLESS POWER CONVERSION TO DC METHOD AND DEVICE

(71) Applicant: Boris Ablov, Jerusalem (IL)

(72) Inventor: Boris Ablov, Jerusalem (IL)

(*) Notice: Subject to any disclaimer, the term of this patent is extended or adjusted under 35 U.S.C. 154(b) by 36 days.

(21) Appl. No.: 15/073,690

(22) Filed: Mar. 18, 2016

(65) Prior Publication Data

US 2016/0276934 A1    Sep. 22, 2016

Related U.S. Application Data

(60) Provisional application No. 62/136,541, filed on Mar. 22, 2015.

(51) Int. Cl.
*H02M 3/158* (2006.01)
*H02M 1/00* (2006.01)

(52) U.S. Cl.
CPC .... *H02M 3/158* (2013.01); *H02M 2001/0058* (2013.01); *Y02B 70/1491* (2013.01)

(58) Field of Classification Search
None
See application file for complete search history.

(56) References Cited

U.S. PATENT DOCUMENTS

| | | | | |
|---|---|---|---|---|
| 2008/0116973 A1* | 5/2008 | McMorrow | ............. | H03F 3/217 330/251 |
| 2010/0270996 A1* | 10/2010 | Ramadas | ................ | H02M 1/36 323/311 |
| 2013/0194846 A1* | 8/2013 | Taddeo | .................... | H02M 1/10 363/123 |
| 2014/0104893 A1* | 4/2014 | Pan | ........................ | H02M 3/337 363/21.02 |
| 2014/0247024 A1* | 9/2014 | Lee | ..................... | H02M 3/1582 323/234 |

* cited by examiner

*Primary Examiner* — Jeffrey Gblende

(57) ABSTRACT

A device and a method for power conversion to DC using zero-current and/or zero-voltage switching. Provides output voltage of any level and polarity. Operates with any input voltage, including DC and AC. Power loss is substantially eliminated. The conversion efficiency is independent of load consumption, from the idle to the maximum power. The EMI level is very low. Provides for input to output isolation without use of transformers.

20 Claims, 14 Drawing Sheets

Fig. 35
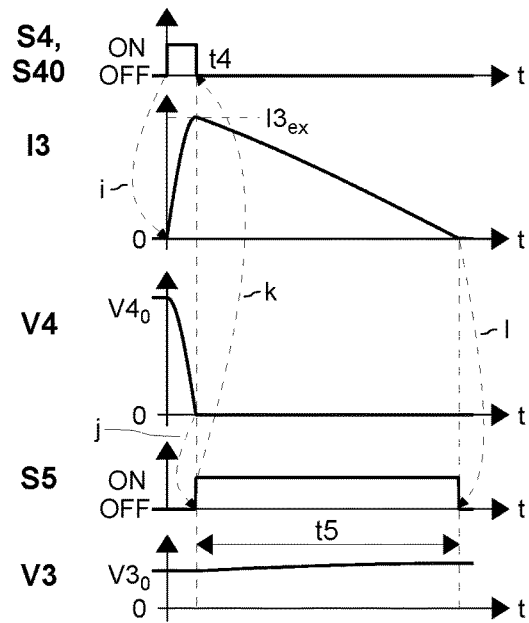
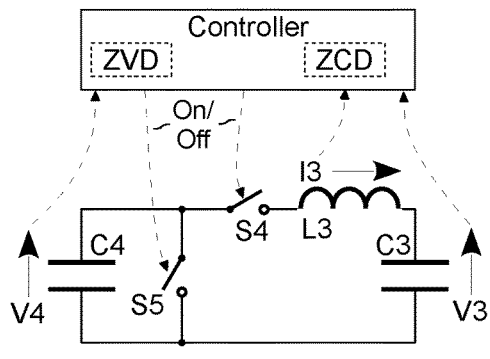
Fig. 36
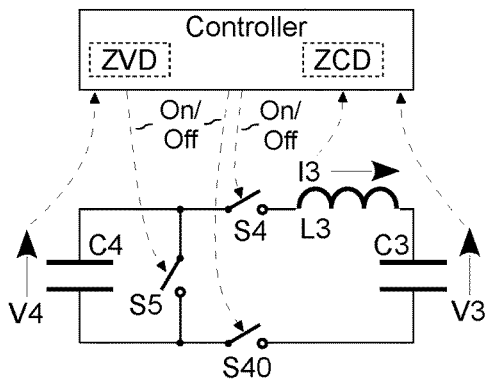
Fig. 37
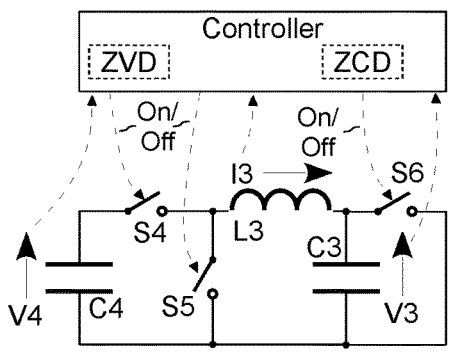
Fig. 38
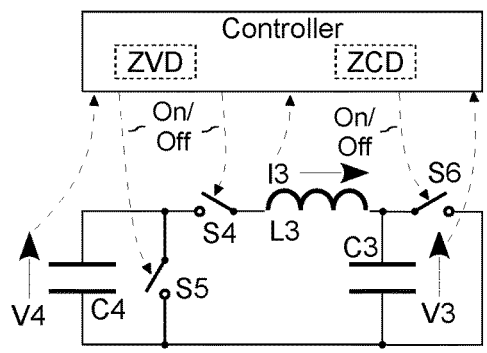
Fig. 39

LOSSLESS POWER CONVERSION TO DC METHOD AND DEVICE

TECHNICAL FIELD

The present disclosure generally relates to the domain of power conversion to DC.

BACKGROUND ART

Different types of DC power supplies and converters are known in the state of the art. Most of these exhibit power losses and many have certain drawbacks. For example transformers, which are often used in such power supplies and converters for isolation and/or AC input voltage transformation, cause electromagnetic interference (EMI), power losses, bigger size, higher mass, and higher cost. Disadvantages experienced when using the known power supplies and converters include those caused by: the systematic power losses because of the use of rectifiers (or diodes); the presence of EMI, particularly because of ringing during switching; the particular operational envelope used, leading to power losses; and inadequate isolation between the input and the output. Furthermore, depending on the particular type of supply/converter used, there may be limitations on the input source voltage range and type (DC or AC), the output voltage range and the polarities of the input and output.

BRIEF SUMMARY OF THE INVENTION

The present disclosure provides for a method and a device for energy transfer between a storage capacitor and a source of an input voltage, using successive energy transfer via coils and capacitors. Each step is ended with zero-current and/or zero-voltage switching, resulting into a lossless energy transfer.

The present disclosure further provides for a DC voltage raising by complete transfer of the energy from a charged capacitor to a coil and then to a smaller capacitor.

In one respect the present disclosure provides for a reversing of voltage thus enabling operation with input voltage of any polarity, including an AC type.

In another respect the present disclosure provides for isolation of the input voltage source from the storage capacitor.

These, and other, respects are described below in the drawings, the description and the claims.

BRIEF DESCRIPTION OF THE DRAWINGS

The present invention will be better understood thanks to the detailed description which follows, and the accompanying drawings, which are given as non-limiting examples of embodiment of the invention, namely:

FIG. 35, showing a timing diagram of a replenishing process in a type A replenishing device;

FIG. 36, showing a circuit diagram of a type B replenishing device as described herein;

FIG. 37, showing a circuit diagram of an isolated type B replenishing device as described herein;

FIG. 38, showing a circuit diagram of a type A replenishing device configured for complete energy return as described herein;

FIG. 39, showing a circuit diagram of a type B replenishing device configured for complete energy return as described herein;

DETAILED DESCRIPTION OF THE INVENTION

Initially the basic building blocks (processes and devices) are introduced. Then various implementations and combinations of these blocks are disclosed. Designation of each capacitor or coil corresponds respectively to its capacitance or inductance value. For simplicity of analyses, all components are considered to be ideal. Loop means closed electrical circuit. By detecting a condition of a current or a voltage becoming zero it is meant detecting when respectively a current or a voltage reaches substantially zero.

Process of Dosing

Dosing is connecting a capacitor to a voltage source through a coil and charging it until the charging current becomes zero.

Figure 1:
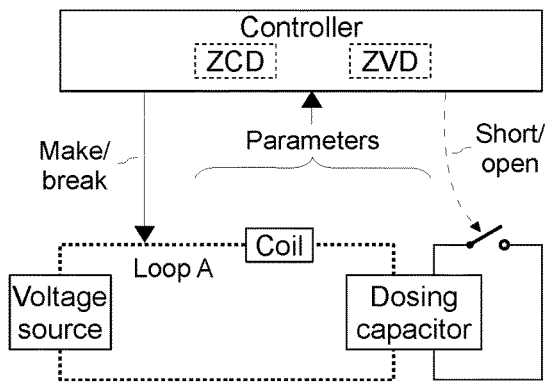
FIG. 1, showing a functional diagram of a dosing device as described herein.

FIG. 1 shows a functional diagram of a dosing device. It comprises a dosing capacitor, a coil, a voltage source, and a controller. Loop A, designated with a single dotted line, comprises the dosing capacitor, the coil, and the voltage source. The controller makes and breaks loop A, shorts and opens the dosing capacitor, inputs process and loop parameters, and detects condition of current or voltage being zero or non-zero, as designated respectively with arrows Make/break, Short/open, Parameters, and with boxes ZCD (Zero Current Detection) and ZVD (Zero Voltage Detection).

Figure 2:
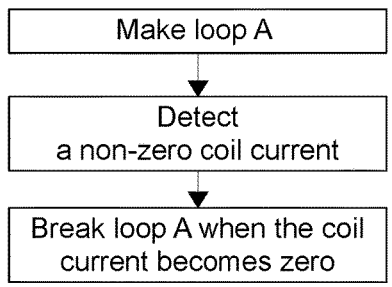
FIG. 2, showing a flowchart of a dosing process as described herein.

FIG. 2 shows a flowchart of a dosing process; the $2^{nd}$ step prevents a premature ending right after the start in a case of a too fast detection of a zero coil current condition.

Figure 3:
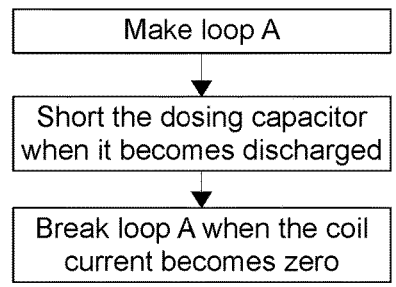
FIG. 3, showing a flowchart of energy return in a dosing device as described herein.

FIG. 3 shows a flowchart of energy return from the dosing capacitor to a voltage source.

Shorting the dosing capacitor is not needed for the dosing.

Various techniques to detect a current or a voltage becoming zero exist, for example a hardware detection, a duration estimation using component and parameter values, or combination thereof. An advanced detection can compensate for the actual delays. A zero current condition may be detected for example using a zero current detector, or through monitoring the direction and/or the value of the current, the induced magnetic field, or the voltage drop on an in-circuit shunt or switch. A zero voltage condition may be detected for example using a voltage comparator.

Figure 4:
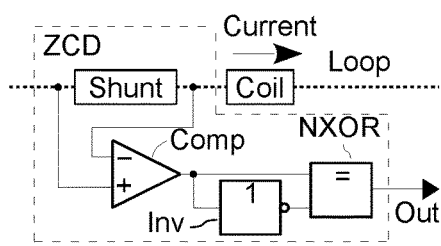
FIG. 4, showing a functional diagram of a zero current detection device as described herein.

FIG. 4 shows a hardware detection of the coil current zero crossing. A low resistance Shunt is connected in series with Coil. An analog voltage comparator Comp changes its output when the voltage drop on Shunt crosses zero. The output is connected directly and also via a logic inverter gate Inv to an exclusive NOR gate NXOR. When the comparator output changes, both inputs of the gate NXOR are equal during the propagation delay of the gate Inv, resulting in a positive pulse at the output Out.

Figure 5:
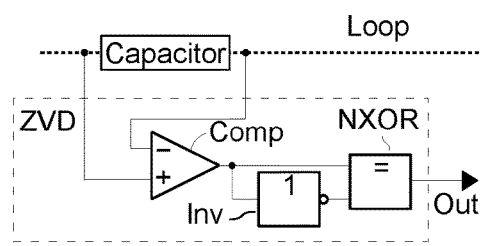
FIG. 5, showing a functional diagram of a zero voltage detection device as described herein.

FIG. 5 shows a hardware detection of a capacitor voltage becoming zero. An analog voltage comparator Comp changes its output when the voltage across the capacitor crosses zero. Its output is connected directly and via a logic inverter gate Inv to an exclusive NOR gate NXOR. When the comparator output changes, both inputs of the gate NXOR are equal during the propagation delay of the gate Inv, resulting in a positive pulse at the output Out.

Figure 6:
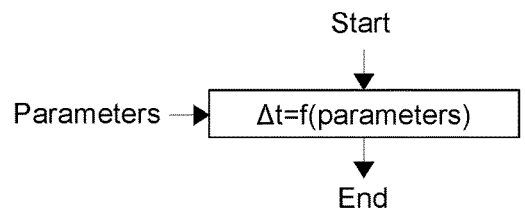
FIG. 6, showing a functional diagram of a process step duration estimator as described herein.

FIG. 6 shows an estimator of duration $\Delta t$ of a process phase, based on parameters of the relevant loop; it may serve for zero current detection and zero voltage detection.

Figure 7:
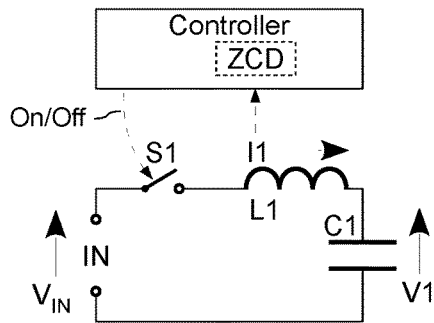
FIG. 7, showing a circuit diagram of a dosing device as described herein.

FIG. 7 exemplifies a dosing device comprising an input terminal pair IN, a dosing switch S1, a dosing coil L1, a dosing capacitor C1, and a Controller with a ZCD. Solid arrows $V_{IN}$, I1, and V1 designate respectively a voltage applied to the input, a current in the coil L1, and a voltage across the capacitor C1; $V_{IN}$ may be DC, AC, or any shape voltage. Dashed arrow On/Off designates control of switch S1: loop A is made or broken when switch S1 is respectively set ON or OFF. Dashed arrow I1 designates inputting by Controller the parameters for box ZCD. In the initial state switch S1 is OFF (so I1=0), capacitor C1 is charged to an initial voltage $V1_0$. The dosing process starts with switch S1 ON, includes a state with a non-zero current I1, and ends with switch S1 OFF when current I1 becomes zero. The energy obtained at input terminal pair IN is transferred via coil L1 to capacitor C1, the transfer is designated IN→C1.

Figure 8:
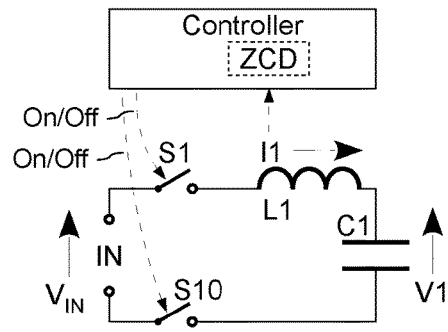
FIG. 8, showing a circuit diagram of an isolated dosing device as described herein.

FIG. 8 exemplifies an isolated dosing device obtained from FIG. 7 by adding a series input isolation switch S10 with a dashed arrow On/Off for its control, such that switches S1 and S10 separate between input terminal pair IN and capacitor C1 on both sides.

Operating switch S10 identically to switch S1 produces same dosing process, but when not in the dosing, capacitor C1 is isolated from input terminal pair IN.

During the dosing at constant $V_{IN}$ values V1 and I1 are:

$$V1=V_{IN}+(V1_0-V_{IN})\cdot\cos(t/\sqrt{L1\cdot C1}) \quad (1)$$

$$I1=(V_{IN}-V1_0)\cdot\sqrt{C1/L1}\cdot\sin(t/\sqrt{L1\cdot C1}) \quad (2)$$

Duration t1 of the dosing process is:

$$t1=\pi\cdot\sqrt{L1\cdot C1} \quad (3)$$

At instant t=½t1, when voltage V1=$V_{IN}$, current I1 reaches its extremum $I1_{ex}$:

$$I1_{ex}=(V_{IN}-V1_0)\cdot\sqrt{C1/L1} \quad (4)$$

Then modulus of current I1 decreases. At instant t=t1 current I1 becomes zero, voltage V1 across capacitor C1 reaches its extremum $V1_{ex}$:

$$V1_{ex}=2\cdot V_{IN}-V1_0, \quad (5)$$

and switch S1 is opened, thus terminating the dosing process.

Figure 9:
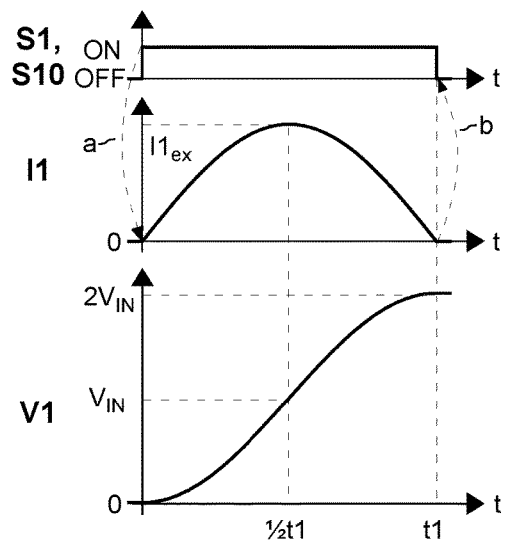
FIG. 9, showing a timing diagram of a dosing process as described herein.

FIG. 9 shows timing diagrams of a dosing process in circuits of FIG. 7 and FIG. 8 with $V1_0=0$ and at a constant $V_{IN}>0$. Horizontal axes represent time, the graphs from top to bottom show respectively state of switches S1 and S10, current I1, and voltage V1. Dashed arrows a and b show respectively start of current I1 rising with setting switches S1, S10 ON, and setting switches S1, S10 OFF when current I1 becomes zero.

No transients occur at making a loop with a series coil or breaking a loop at no current.

A coil with no current stores no energy. Thus no methodical energy loss occurs in the dosing. At a constant $V_{IN}$ dosing is a part of the period of the loop A resonant frequency so only EMI at that resonant frequency is generated during the dosing.

Figure 10:
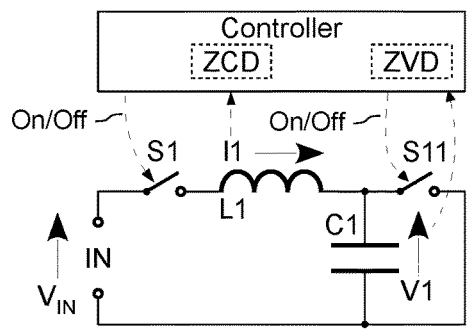
FIG. 10, showing a circuit diagram of a dosing device with provision for energy return as described herein.

FIG. 10 exemplifies a dosing device configured to return energy from the dosing capacitor to the voltage source according to the process in FIG. 3. Further to FIG. 7, its Controller shorts or opens capacitor C1 by setting switch S11 respectively ON or OFF via its related dashed arrow On/Off, receives the voltage V1 related parameter, as designated with a dashed arrow from V1, and has a ZVD box to detect voltage V1 becoming zero. The process consists of two phases. Initially switches S1, S11 are OFF. Phase C1=L1,IN starts with switch S1 ON and ends with switch S11 ON when voltage V1=0. Phase L1→IN starts automatically with the end of phase C1→L1,IN, and ends with switch S1 OFF when current I1=0.

Initial voltage across C1 is $V1_0$. Phase C1=L1,IN is described by equation:

$$V_{IN}+L1\cdot I1 = V1_0 - \frac{1}{C1}\cdot\int_0^t I1\,dt \quad (6)$$

At a constant $V_{IN}$ duration t8 of phase C1→L1,IN is:

$$t8=\sqrt{L1\cdot C1}\cdot\arccos[V_{IN}/(V_{IN}-V1_0)] \quad (7)$$

At the end of phase C1→L1,IN current $I1_{rtn}$ in the coil L1 is:

$$I1_{rtn}=V1_0\cdot\sqrt{C1/L1} \quad (8)$$

The phase L1=IN is described by equation:

$$V_{IN}=L1\cdot I1 \quad (9)$$

For an input power source with a constant voltage, duration t9 of the phase L1→IN is:

$$t9=I1_{rtn}\cdot L1/V_{IN}=V1_0/V_{IN}\cdot\sqrt{L1\cdot C1} \quad (10)$$

The return is feasible if voltages $V1_0$, $V_{IN}$ have the same polarity and $|V1_0|\geq 2\cdot|V_{IN}|$.

No transients occur at making a loop with a series coil, shorting a discharged capacitor, or breaking a loop at no current. A discharged capacitor and a coil with no current store no energy. Thus no methodical energy loss occurs during energy return in a dosing device. Phase C1→L1,IN is a part of one period of the loop A resonant frequency. The current in phase L1→IN changes linearly. Thus only EMI at that resonant frequency is generated in a dosing device during the energy return.

Process of Reversing of Type A (Reversing the Charge of a Capacitor)

Figure 11:
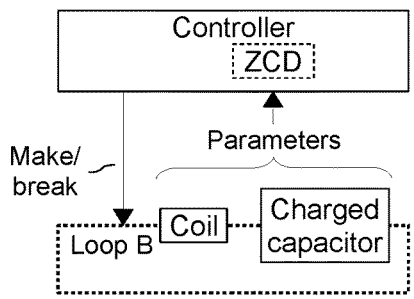
FIG. 11, showing a functional diagram of a capacitor charge reversing device as described herein.

Reversing of type A is making a loop with a charged capacitor and a coil until the coil current becomes zero. FIG. 11 shows a functional diagram of a reversing device of type A. It comprises a loop B comprising a charged capacitor and a coil as designated with a single dotted line, and a controller. The controller makes or breaks loop B, inputs the process and loop parameters, and detects condition if the coil current is zero or non-zero, as designated respectively with arrows Make/break, Parameters, and box ZCD.

Figure 12:
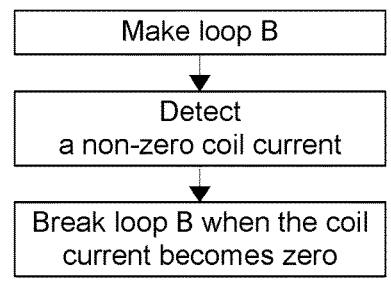
FIG. 12, showing a flowchart of a capacitor charge reversing process as described herein.

FIG. 12 shows a flowchart of a type A reversing process; the $2^{nd}$ step prevents ending right after the start due to a too fast detection of a zero coil current condition.

Figure 13:
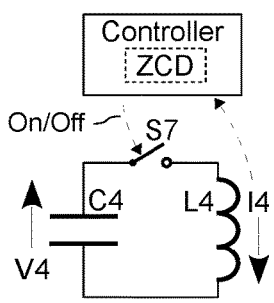
FIG. 13, showing a circuit diagram of a capacitor charge reversing device as described herein.

FIG. 13 exemplifies a type A reversing device comprising a charged capacitor C4, a reversing coil L4, a reversing switch S7, and a Controller with a ZCD. Solid arrows I4 and V4 designate respectively the current in coil L4 and the voltage across capacitor C4. Dashed arrow On/Off designates control of switch S7: loop B is made or broken when switch S7 is set respectively ON or OFF. Dashed arrow I4 designates inputting by Controller parameters for box ZCD. In the initial state switch S7 is OFF (so I4=0), capacitor C4 is charged to an initial voltage $V4_0$. Reversing starts with switch S7 ON and ends with switch S7 OFF when current I4 becomes zero. Duration of the process is $t0=\pi\sqrt{L4\cdot C4}$. At instant t=½t0 capacitor C4 becomes discharged and current I4 reaches its extremum $I4_{ex}$:

$$I4_{ex}=V4_0\cdot\sqrt{C4/L4} \quad (11)$$

Figure 14:
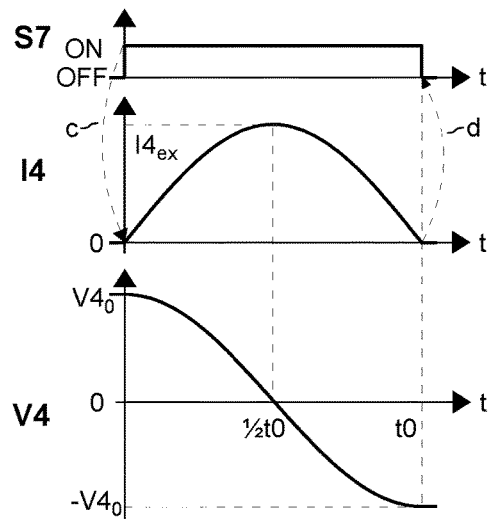
FIG. 14, showing a timing diagram of a capacitor charge reversing process as described herein.

FIG. 14 shows timing diagrams of the type A reversing process for voltage $V4_0>0$.

Horizontal axes represent time, the graphs from top to bottom show respectively state of switch S7, current I4, and voltage V4. Dashed arrow c shows start of current I4 raising with setting switch S7 ON. Dashed arrow d shows setting switch S7 OFF when current I4 becomes zero at time t0.

No transients occur at making a loop with a series coil or breaking a loop at no current.

A coil with no current stores no energy. Thus no methodical energy loss occurs in type A reversing. Reversing is a part of one period of the loop B resonant frequency, so only EMI at that resonant frequency is generated during type A reversing.

Reversing of Type B (Interchanging Capacitor Terminals in Connection to It)

Figure 15:
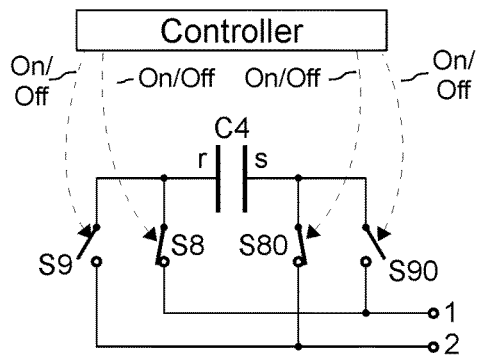
FIG. 15, showing a circuit diagram of a capacitor terminals interchanging device as described herein.
Figure 16:
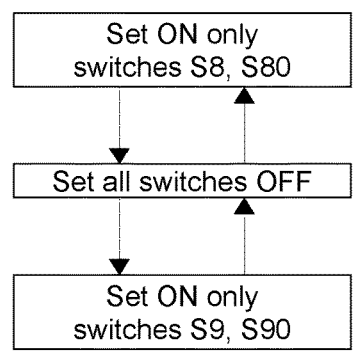
FIG. 16, showing a flowchart of a capacitor terminals interchanging procedure as described herein.

The circuit in FIG. 15 comprises a charged capacitor C4 with plates r and s, switches S9, S90, S8, and S80, terminals 1 and 2, and a Controller. Four dashed arrows On/Off designate switch control by Controller. If only switches S8 and S80 are ON, plates r and s are connected respectively to terminals 1 and 2; and if only switches S9 and S90 are ON, the connection is reversed. FIG. 16 shows a flowchart of reversing procedures: the top down direction specifies transfer from the direct to the reverse connection, the bottom up direction specifies transfer from the reverse to the direct connection.

There is no energy transfer thus no energy loss occurs and no EMI is generated in type B reversing.

Process of Raising

The transfer of the energy stored in a bigger capacitor to a smaller one results in increase of the voltage of the electric charge. The process of transfer is called raising.

Raising of types A, B, and C

Figure 17:
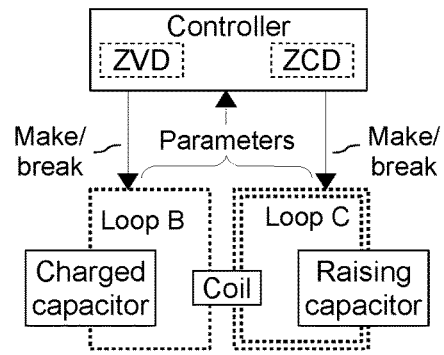
FIG. 17, showing a functional diagram of a raising device of types A, B, and C as described herein.
Figure 18:
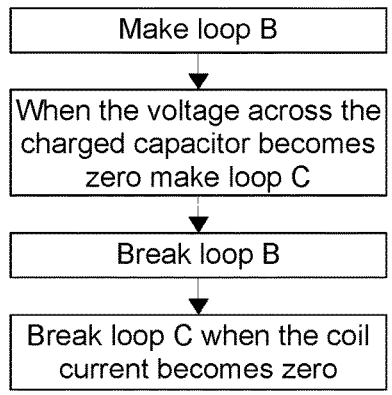
FIG. 18, showing a flowchart of a raising process in a raising device of types A, B, and C as described herein.
Figure 19:
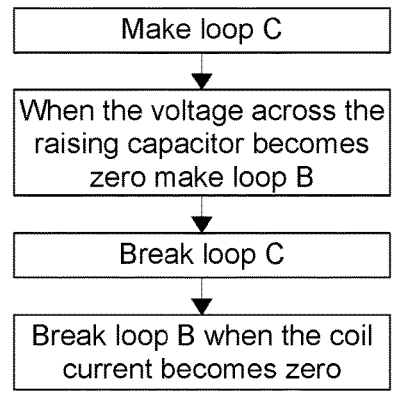
FIG. 19, showing a flowchart of a backward process in a raising device of types A, B, and C as described herein.

FIG. 17 shows a functional diagram of types A, B, and C raising devices. It comprises a charged capacitor, a coil, a raising capacitor, and a controller. Loop B designated with a single dotted line comprises the charged capacitor and the coil. Loop C designated with a double dotted line comprises the coil and the raising capacitor. The controller makes and breaks loops B and C, inputs process and loop parameters, and detects conditions of current or voltage becoming zero, as designated respectively with arrows Make/break, arrow Parameters, and boxes ZCD and ZVD. FIG. 18 and FIG. 19 show flowcharts of types A, B, C raising and related backward processes, respectively.

Figure 20:
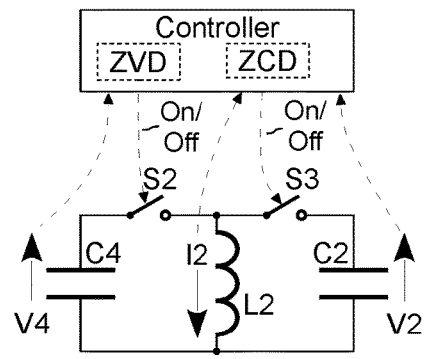
FIG. 20, showing a circuit diagram of a type A raising device as described herein.

FIG. 20 exemplifies a type A raising device comprising a charged capacitor C4, a discharging switch S2, a raising coil L2, a raising switch S3, a raising capacitor C2, and a Controller with ZVD and ZCD. Solid arrows V4, I2, and V2 designate respectively the voltage across capacitor C4, the current in coil L2, and the voltage across capacitor C2.

Dashed arrows V4, I2, and V2 designate inputting by Controller the loops and process parameters. Dashed arrows On/Off to switches S2 and S3 designate control of loops B and C, respectively. In the initial state switches S2 and S3 are OFF (so I2=0), capacitor C4 is charged to a voltage $V4_0$, capacitor C2 is not charged. Raising comprises two energy transfer phases. Phase C4→L2 starts with switch S2 ON, and ends with switch S3 ON when voltage V4 becomes zero. Phase L2→C2 starts after the end of phase C4→L2 with immediate switch S2 OFF, and ends with switch S3 OFF when current I2 becomes zero and V2 has a needed polarity. In phase C4→L2 switch S3 is OFF so only loop B is active. If not interrupted, capacitor C4 becomes discharged and current I2 reaches its extremum $I2_{ex}$ periodically after elapse of time t2:

$$t2 = 0.5 \cdot \pi \cdot \sqrt{L2 \cdot C4} \cdot (2i-1) \text{ where } i=1, 2, 3, \ldots \quad (12)$$

$$I2_{ex} = (-1)^{i+1} \cdot V4_0 \cdot \sqrt{C4/L2} \text{ where } i=1, 2, 3, \quad (13)$$

Switching S3 ON at one of these instances connects the discharged capacitor C2 to points with zero potential difference, thus creating an alternative coil current route. This ends phase C4→L2 and begins phase L2→C2 in which immediate setting switch S2 OFF prevents recharging of capacitor C4. Now only loop C is active. If not interrupted, current I2 becomes zero periodically after elapse of time t3:

$$t3 = 0.5 \cdot \pi \cdot \sqrt{L2 \cdot C2} \cdot (2j-1) \text{ where } j=1, 2, 3, \quad (14)$$

Switching S3 OFF at one of these instances ends phase L2→C2 with capacitor C2 charged to the voltage $V2_{ex}$:

$$V2_{ex} = (-1)^{i+j+1} \cdot V4_0 \cdot \sqrt{C4/C2} \quad (15)$$

According to formula (15) modulus of the voltage is raised at C4>C2 or reduced at C4<C2, the polarity of voltage is retained at odd i+j or reversed at even i+j. A minimum duration, EMI, and losses are achieved at i=j=1 for reversed polarity; at i=1, j=2 for same polarity and C4>C2; and at i=2, j=1 for same polarity and C4<C2.

Figure 21:
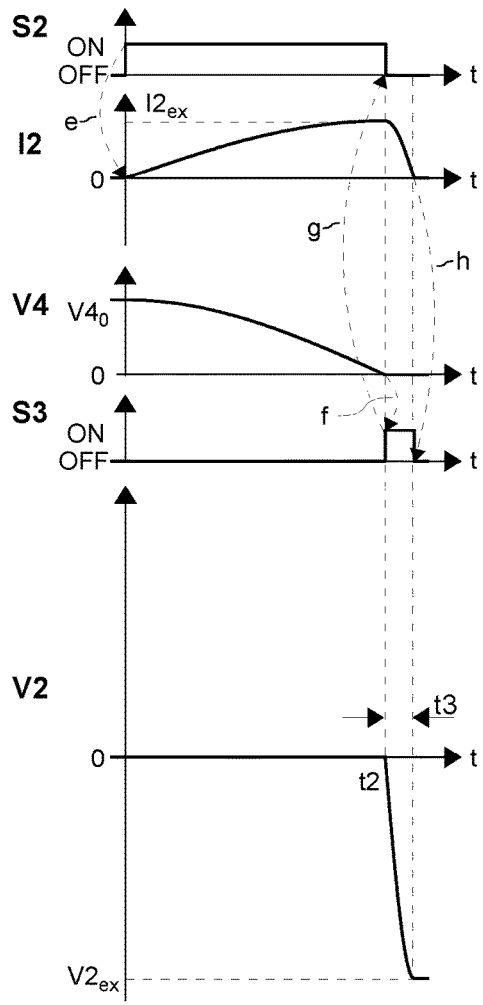
FIG. 21, showing a timing diagram of a type A raising process with voltage reversing as described herein.
Figure 22:
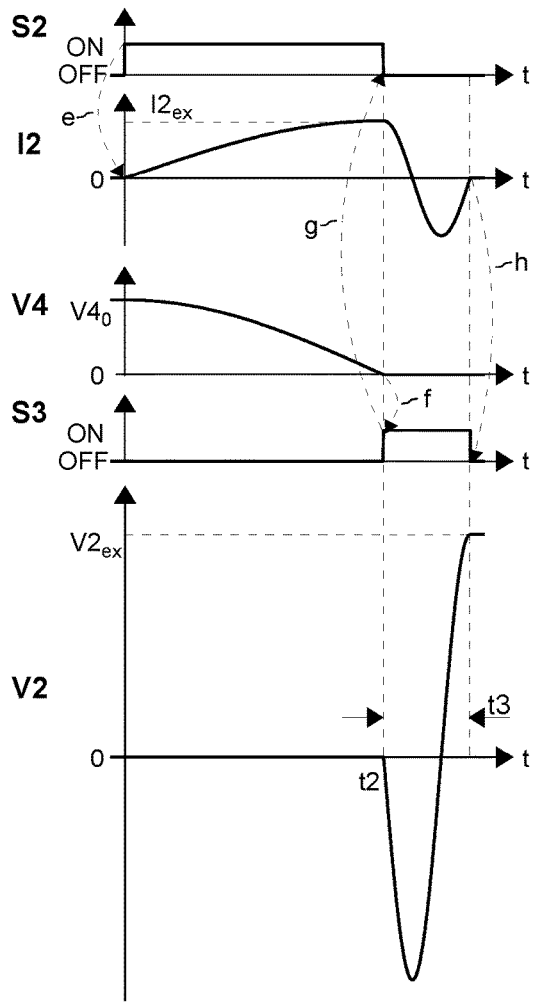
FIG. 22, showing a timing diagram of a type A raising process without voltage reversing as described herein.

FIG. 21 and FIG. 22 show timing diagrams of the shortest type A raising process in the device of FIG. 20 for respectively reversing and retaining the voltage polarity, at $V4_0$>0 and C4>C2. Horizontal axes represent time, the graphs from top to bottom show respectively state of switch S2, current I2, voltage V4, state of switch S3, and voltage V2; the dashed arrows e, f, g, and h show respectively start of current I2 rising after setting switch S2 ON, setting switch S3 ON when voltage V4 becomes zero, setting switch S2 OFF after setting switch S3 ON, and setting switch S3 OFF when current I2 becomes zero. Time t2 and interval t3 are per expressions (12) and (14), respectively.

The related backward process, with initially uncharged C4 and charged C2 capacitors and both switches OFF, comprises two energy transfer phases. Phase C2→L2 starts with switch S3 ON, it ends with switch S2 ON when voltage V2=0. Phase L2→C4 starts after the end of phase C2→L2 with immediate switch S3 OFF, and ends with switch S2 OFF when current I2 becomes zero and polarity of V2 is as needed. Shortest duration is selected as in the raising.

Raising of Type B

Figure 23:
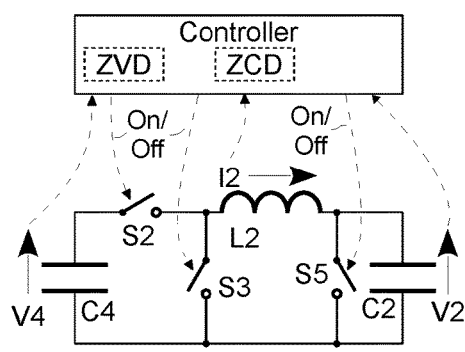
FIG. 23, showing a circuit diagram of a type B raising device as described herein.

FIG. 23 exemplifies a type B raising device comprising a capacitor C4, a discharging switch S2, a raising switch S3, a raising coil L2, a raising capacitor C2, a shorting switch S5, and a controller with boxes ZCD and ZVD configured to detect zero current and zero voltage. Solid arrows I2, V4, and V2 designate respectively current in coil L2, and voltage across capacitors C4 and C2. Dashed arrows V4, I2, and V2 designate inputting by Controller the loops and process parameters. Dashed arrows On/Off to switches S2, S3, and S5 designate their control. In the initial state switches S2 and S3 are OFF (so I2=0), switch S5 is ON, capacitor C4 is charged to a voltage V40, capacitor C2 is uncharged. The raising comprises two energy transfer phases. Phase C4→L2 starts with switch S2 ON and ends with switch S3 ON when voltage V4 becomes zero. Phase L2→C2 starts after the end of phase C4→L2 with switch S5 OFF, includes switch S2 OFF, and ends with switch S3 OFF when current I2 becomes zero and polarity of V2 is as needed. Expressions (12), (13) and (14) apply directly, (15) applies with reversed polarity. Delay in the start of the second phase results in a power loss due to actual loop resistance, and in a prolonged generated magnetic field while the coil current I2 lasts.

The related backward process with initially charged C2 and discharged C4 capacitors and all switches OFF comprises two energy transfer phases. Phase C2→L2 starts with switch S3 ON, includes switch S2 ON, and ends with switch S5 ON when voltage V2=0. Phase L2→C4 starts after the end of phase C2→L2 with switch S3 OFF, and ends with switch S2 OFF when current I2 becomes zero and polarity of V4 is as needed. Delay in the start of the second phase results in a power loss due to actual loop resistance, and in a prolonged generated magnetic field while the coil current I2 lasts.

Raising of Type C

Figure 24:
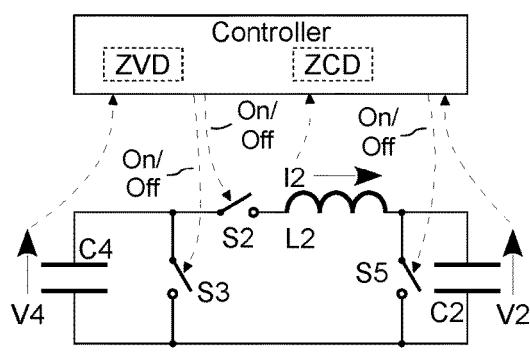
FIG. 24, showing a circuit diagram of a type C raising device as described herein.

FIG. 24 exemplifies a type C raising device comprising a capacitor C4, a discharging switch S2, a raising switch S3, a raising coil L2, a raising capacitor C2, a shorting switch S5, and a controller configured to detect zero current and and voltage, designated with boxes ZCD and ZVD. Solid arrows I2, V4, and V2 designate respectively current in coil L2, and voltage across capacitors C4 and C2. Dashed arrows V4, I2, and V2 designate inputting by Controller the loops and process parameters. Dashed arrows On/Off to switches S2, S3, and S5 designate their control. In the initial state switches S2, S3 are OFF (so I2=0), switch S5 is ON, capacitor C4 is charged to a voltage V4$_0$, capacitor C2 is uncharged. The raising comprises two energy transfer phases. Phase C4→L2 starts with switch S2 ON and ends with switch S3 ON when voltage V4 becomes zero. Phase L2→C2 starts after the end of phase C4→L2 with switch S5 OFF, and ends with switch S2 OFF when current I2 becomes zero and polarity of V2 is as needed. Expressions (12), (13) and (14) apply directly, (15) applies with reversed polarity. Delay in the start of the second phase results in a power loss due to actual loop resistance, and in a prolonged generated magnetic field while the coil current I2 lasts.

The related backward process with initially uncharged C4 and charged C2 capacitors, and switches S3 ON and S2, S5 OFF, comprises two energy transfer phases. Phase C2→L2 starts with switch S2 ON, and ends with switch S5 ON when voltage V2=0. Phase L2→C4 starts after the end of phase C2→L2 with switch S3 OFF, and ends with switch S2 OFF when current I2 becomes zero and polarity of V4 is as needed. Delay in the start of the second phase results in a power loss due to actual loop resistance, and in a prolonged generated magnetic field while the coil current I2 lasts.

Raising of Type D

Figure 25:
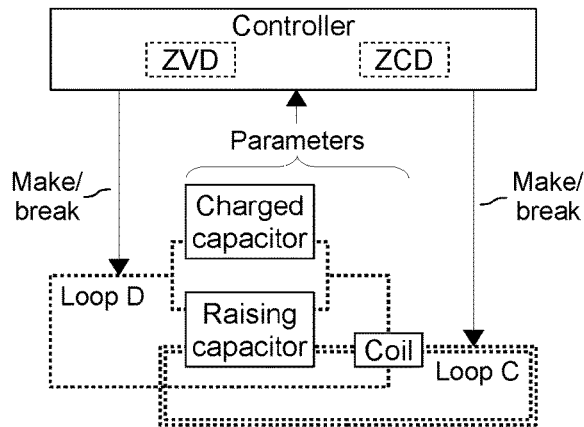
FIG. 25, showing a functional diagram of a type D raising device as described herein.
Figure 26:
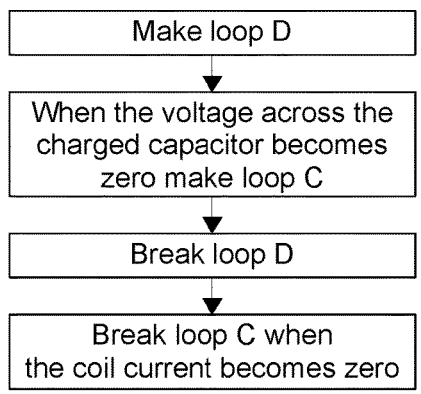
FIG. 26, showing a flowchart of a raising process in a type D raising device as described herein.
Figure 27:
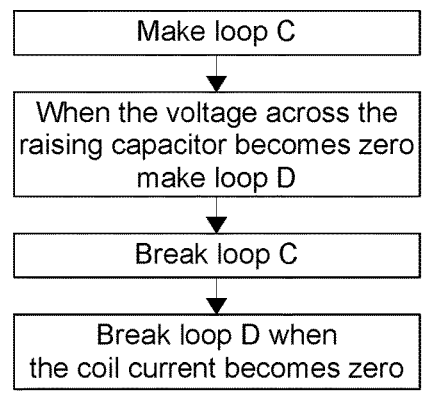
FIG. 27, showing a flowchart of a backward process in a type D raising device as described herein.

FIG. 25 shows a functional diagram of type D raising device. It comprises a charged capacitor, a coil, a raising capacitor, and a controller. Loop D, designated with a single dotted line, comprises the charged and the raising capacitors connected in parallel with each other, and the coil. Loop C, designated with a double dotted line, comprises the coil and the raising capacitor. The controller makes and breaks loops D and C, inputs process and loop parameters, and detects a condition of current or voltage becoming zero, as designated respectively with arrows Make/break, arrow Parameters, and boxes ZCD and ZVD. FIG. 26 and FIG. 27 show respectively flowcharts of type D raising and related backward processes.

Figure 28:
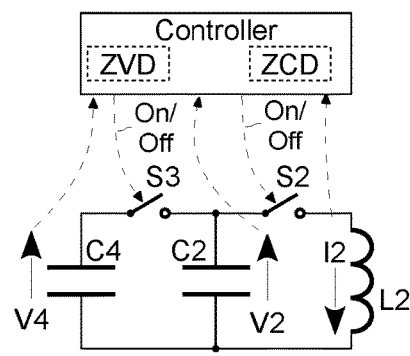
FIG. 28, showing a circuit diagram of a type D raising device as described herein.

FIG. 28 exemplifies a type D raising device comprising a charged capacitor C4, a discharging switch S2, a raising coil L2, a raising switch S3, a raising capacitor C2, and a Controller with ZVD and ZCD. Solid arrows I2, V4, and V2 designate respectively the current in coil L2, and the voltage across capacitors C4 and C2. Dashed arrows V4, I2, and V2 designate inputting by Controller the loops and process parameters. Dashed arrows On/Off designate control of switches S2 and S3. In the initial state switch S2 is OFF and switch S3 is ON (so I2=0), capacitors C2 and C4 are charged to a voltage V40.

The raising comprises two energy transfer phases. Phase C4,C2→L2 starts with switch S2 ON and ends with switch S3 OFF when voltage V4 becomes zero. Phase L2→C2 starts automatically with the end of phase C4,C2→L2, and ends with switch S2 OFF when current I2 becomes zero. In phase C4,C2→L2 capacitors C4 and C2 form one capacitor with resulting capacitance C4+C2. If not interrupted, capacitors C2 and C4 become discharged and current I2 reaches its extremum I2$_{ex}$ periodically after elapse of time t2:

$$t2 = 0.5 \cdot \pi \cdot \sqrt{L2 \cdot (C2+C4)} \cdot (2i-1) \text{ where } i=1, 2, 3, \ldots \quad (16)$$

$$I2_{ex} = (-1)^{i+1} \cdot V4_0 \cdot \sqrt{(C2+C4)/L2} \text{ where } i=1, 2, 3, \quad (17)$$

Switching S3 OFF at one of these instances disconnects the discharged capacitor C2.

Now only loop C is active. If not interrupted, current I2 becomes zero periodically after elapse of time t3:

$$t3 = 0.5 \cdot \pi \cdot \sqrt{L2 \cdot C2} \cdot (2j-1) \text{ where } j=1, 2, 3, \quad (18)$$

Switching S2 OFF at one of these instances ends phase L2→C2 with capacitor C2 charged to the voltage V2$_{ex}$:

$$V2_{ex} = (-1)^{i+j+1} \cdot V4_0 \cdot \sqrt{(C2+C4)/C2} \quad (19)$$

According to formula (19) the polarity of voltage is retained at odd i+j or reversed at even i+j. Minimum duration, EMI, and losses in the raising are achieved at i=j=1 for reversed polarity, and at i=1, j=2 for same polarity.

The related backward process, with initially charged C2 and discharged C4 capacitors and both switches OFF, comprises two energy transfer phases. Phase C2→L2 starts with switch S2 ON, and ends with switch S3 ON when voltage V2=0. Phase L2→C2,C4 starts automatically with the end of phase C2→L2, and ends with switch S2 OFF when current I2 becomes zero and polarity of the voltage across C2, C4 is as needed.

In all types of raising or related backward processes, no transients occur at making a loop with a series coil, connecting a discharged capacitor to points with zero voltage, removing one of two current routes, or breaking a loop at no current. A discharged capacitor and a coil with no current store no energy. Thus no methodical energy loss occurs. Each of phases is a part of one period of the resonant frequency of the relevant loop, so only EMI at those two resonant frequencies is generated.

Process of Replenishing

Figure 29:
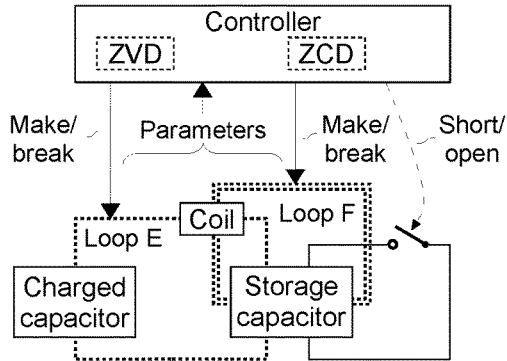
FIG. 29, showing a functional diagram of a replenishing device as described herein.
Figure 30:
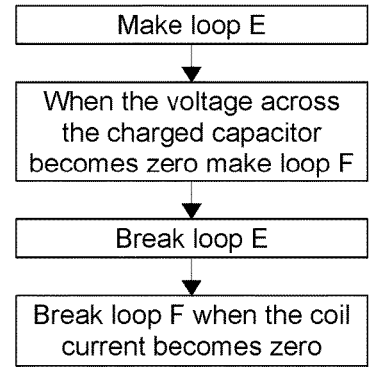
FIG. 30, showing a flowchart of a replenishing process as described herein.
Figure 31:
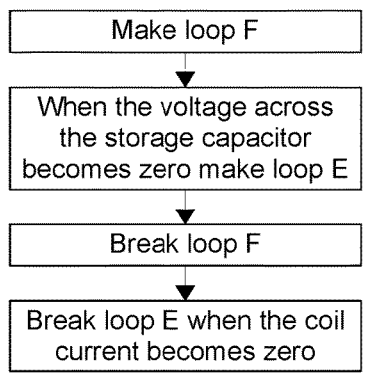
FIG. 31, showing a flowchart of a partial energy return process in a replenishing device as described herein.
Figure 32:
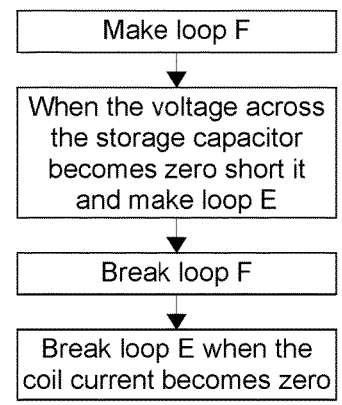
FIG. 32, showing a flowchart of a complete energy return process in a replenishing device as described herein.

The transfer of energy from a smaller capacitor to a bigger one results in an increase of the voltage across the bigger capacitor. The process of transfer is called replenishing. FIG. 29 shows a functional diagram of a replenishing device. It comprises a charged and a storage capacitors, a coil, and a controller. Loop E designated with a single dotted line comprises the charged and the storage capacitors and the coil. Loop F designated with a double dotted line comprises the coil and the storage capacitor. The controller makes and breaks loops E and F, inputs process and loop parameters, shorts and opens the storage capacitor, and detects a condition of current or voltage becoming zero as designated respectively with arrows Make/break, Parameters, Short/open, and boxes ZCD and ZVD. FIG. 30 shows a flowchart of a replenishing process. FIG. 31 and FIG. 32 show flowcharts of a partial and a complete energy transfer from the storage capacitor to the charged capacitor, respectively. Provision for shorting the storage capacitor is not needed in the processes of FIG. 30, FIG. 31.

Replenishing of Type A

Figure 33:
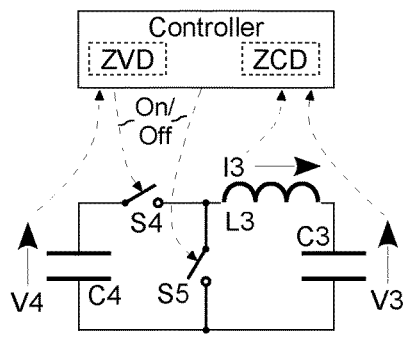
FIG. 33, showing a circuit diagram of a type A replenishing device.

FIG. 33 exemplifies a type A replenishing device comprising a shorting switch S5, a capacitor C4, a replenishing switch S4, a replenishing coil L3, a storage capacitor C3, and a Controller with ZVD and ZCD. Solid arrows V4, V3, and I3 designate voltage across capacitors C4, C3, and current in coil L3 respectively. Dashed arrows V4, I3, and V3 designate inputting by Controller the loops and process parameters. Dashed arrows On/Off designate control of switches S4 and S5. In the initial state capacitors C4, C3 are charged respectively to voltages V40, V30, switches S4, S5 are OFF, so current I3=0. The replenishing comprises two energy transfer phases. Phase C4→L3,C3 starts with switch S4 ON and ends with switch S5 ON when voltage V4 becomes zero. Phase L3→C3 starts automatically with the end of phase C4→L3,C3, includes switch S4 OFF, and ends with switch S5 OFF when current I3 becomes zero.

Figure 34:
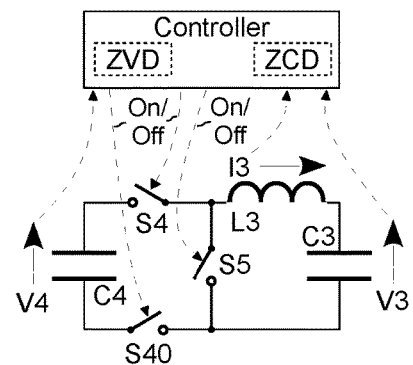
FIG. 34, showing a circuit diagram of an isolated type A replenishing device.

FIG. 34 exemplifies an isolated type A replenishing device obtained from FIG. 33 by adding an output isolation switch S40 such that switches S4 and S40 separate between capacitors C4 and C3 on both sides, and a dashed arrow On/Off for its control.

Operating switch S40 identically to switch S4 produces same replenishing process, but when not in the replenishing, capacitor C4 is isolated from capacitor C3.

During the phase C4→L3,C3 voltage V4 is described by expression:

$$V4 = V4_0 C3 \cdot (V4_0 - V3_0) \cdot \{1 - \cos[t/\sqrt{L3 \cdot C3 \cdot C4/(C3+C4)}]\}/(C3+C4) \quad (20)$$

Voltage V3 is described by expression:

$$V3 = V3_0 C4 \cdot (V4_0 - V3_0) \cdot \{1 - \cos[t/\sqrt{L3 \cdot C3 \cdot C4/(C3+C4)}]\}/(C3+C4) \quad (21)$$

Capacitor C4 becomes discharged after elapse of time t4:

$$t4 = \sqrt{L3 \cdot C4 \cdot C3/(C4+C3)} \cdot \arccos[-(V3_0 + V4_0 \cdot C4/C3)/(V4_0 - V3_0)] \quad (22)$$

Expression (22) is valid and replenishing is feasible if:

$$|V3_0 + V4_0 \cdot C4/C3| \leq |V4_0 - V3_0| \quad (23)$$

Value of current $I3_{end}$ at the end of phase C4→L3,C3 is:

$$I3_{end} = \sqrt{[2 \cdot C4 \cdot C3 \cdot V4_0 \cdot (V4_0 - V3_0) - C4 \cdot (C3+C4) \cdot V4_0^2]/(C3 \cdot L3)} \quad (24)$$

Voltage $V3_{end}$ across capacitor C3 at the end of phase C4→L3,C3:

$$V3_{end} = V3_0 + V4_0 \cdot C4/C3 \quad (25)$$

During phase L3→C3 capacitor C4 is initially shorted and then disconnected, so only capacitor C3 and coil L3 determine the process. Initial conditions for this phase coincide with the end conditions (24) and (25) of phase C4→L3,C3. Voltage V3 across capacitor C3 is described by expression:

$$V3 = I3_{end} \sqrt{L3/C3} \cdot \sin(t/\sqrt{L3 \cdot C3}) + V3_{end} \cos(t/\sqrt{L3 \cdot C3}) \quad (26)$$

Current I3 in coil L3 is described by expression:

$$I3 = I3_{end} \cos(t/\sqrt{L3 \cdot C3}) V3_{end} \cdot C3/L3 \cdot \sin(t/\sqrt{L3 \cdot C3}) \quad (27)$$

Phase L3→C3 ends when current I3 becomes zero, its duration t5 is:

$$t5 = \sqrt{L3 \cdot C3} \cdot \text{arctg}(I3_{end} \sqrt{L3/C3}/V3_{end}) \quad (28)$$

FIG. 35 shows timing diagrams of the replenishing process in the devices of FIG. 33 and FIG. 34. Horizontal axes represent time, the graphs from top to bottom show respectively state of switches S4, S40, current I3, voltage V4, state of switch S5, voltage V3; the dashed arrows i, j, k, and l show respectively start of current I3 rising when switches S4, S40 are set ON, setting switch S5 ON when voltage V4 becomes zero, setting switches S4, S40 OFF after setting switch S5 ON, and setting switch S5 OFF when current I3 becomes zero.

The related backward process according to the flowchart in FIG. 31, with initially discharged C4 and charged C3 capacitors and all switches OFF, comprises two energy transfer phases. Phase C3→L3 starts with switch S5 ON, includes switches S4, S40 ON, and ends with switch S5 OFF when voltage V3=0. Phase L3→C4,C3 starts automatically when phase C3→L3 ends, and ends with switches S4, S40 OFF when current I3=0. As a result capacitor C4 obtains part C3/(C3+C4) of the initial energy in capacitor C3.

At the beginning of the related backward process the voltage across capacitor C3 is $V3_0$. Duration t6 of the phase C3→L3 is:

$$t6 = 0.5 \cdot \pi \cdot \sqrt{L3 \cdot C3} \quad (29)$$

Duration t7 of phase L3→C4,C3 is:

$$t7 = 0.5 \cdot \pi \cdot \sqrt{L3 \cdot C3 \cdot C4/(C3+C4)} \quad (30)$$

At the end of phase L3→C4 voltage $V4_{rtn}$ across capacitor C4 is:

$$V4_{rtn} = V3_0 \cdot \sqrt{(C3+C4)/C4} \quad (31)$$

Replenishing of Type B

FIG. 36 exemplifies a type B replenishing device comprising a shorting switch S5, a capacitor C4, a replenishing switch S4, a replenishing coil L3, a storage capacitor C3, and a Controller with ZVD and ZCD. Solid arrows V4, V3, and I3 designate respectively voltage across capacitors C4, C3, and current in coil L3. Dashed arrows V4, I3, and V3 designate inputting by Controller the loops and process parameters. Dashed arrows On/Off designate control of switches S4 and S5. In the initial state capacitors C4, C3 are charged respectively to voltages $V4_0$, $V3_0$, and switches S4, S5 are OFF, so current I3=0. The replenishing comprises two energy transfer phases. Phase C4→L3,C3 starts with switch S4 ON and ends with switch S5 ON when voltage V4 becomes zero. Phase L3→C3 starts automatically with the end of phase C4→L3,C3 and ends with switch S4 OFF when current I3 becomes zero.

FIG. 37 exemplifies an isolated type B replenishing device obtained from FIG. 36 by adding a switch S40, such that switches S4 and S40 separate between capacitors C4 and C3 on both sides, and a dashed arrow On/Off for its control. Operating switch S40 identically to switch S4 produces same replenishing process, but when not in the replenishing, capacitor C4 is isolated from capacitor C3.

The related backward process according to the flowchart in FIG. 31, with initially discharged C4 and charged C3 capacitors, and switches S5 ON and S4, S40 OFF, comprises two energy transfer phases. Phase C3→L3 starts with switches S4, S40 ON and ends with switch S5 OFF when voltage V3=0. Phase L3→C4, C3 starts automatically when phase C3→L3 ends, and ends with switches S4, S40 OFF when current I3 becomes zero. As a result capacitor C4 obtains part C3/(C3+C4) of the initial energy in capacitor C3.

Expressions (20) to (31) apply.

FIG. 38 and FIG. 39 exemplify respectively a type A and a type B replenishing device configured for complete energy return according to the process in FIG. 32. Each device comprises a shorting switch S5, a capacitor C4, a replenishing switch S4, a replenishing coil L3, a storage capacitor C3, a bypassing switch S6, and a Controller with ZVD and ZCD. Solid arrows V4, V3, and I3 designate respectively voltage across capacitors C4, C3, and current in coil L3. Dashed arrows V4, I3, and V3 designate inputting by Controller the loops and process parameters. Dashed arrows On/Off designate control of switches S4, S5, and S6. Replenishing process is same as respectively for FIG. 33 and FIG. 34, with switch S6 being OFF at all times.

The related backward process in device of FIG. 38, with initially discharged C4 and charged C3 capacitors and all switches OFF, comprises two energy transfer phases. Phase C3→L3 starts with switch S5 ON, includes switch S4 ON, and ends with switch S6 ON when voltage V3=0. Phase L3→C4 starts, after phase C3→L3 ends, with immediate switch S5 OFF, and ends with switch S4 OFF when current I3 becomes zero. Delay in the start of the second phase results in a power loss due to actual loop resistance, and in a prolonged generated magnetic field while the coil current I3 lasts. Devices of FIG. 38 and FIG. 23 look similar, but are used differently.

Expression (29) for duration t6 applies. Duration t7 of phase L3→C3 is:

$$t7 = 0.5 \cdot \pi \cdot \sqrt{L3 \cdot C4} \qquad (32)$$

At the end of phase L3→C4 voltage $V4_{rm}$ across capacitor C4 is:

$$V4_{rm} = V3_0 \cdot \sqrt{C3/C4} \qquad (33)$$

The related backward process in device of FIG. 39, with initially uncharged C4 and charged C2 capacitors and switches S5 ON and S4,S6 OFF, comprises two energy transfer phases. Phase C3→L3 starts with switch S4 ON and ends with switch S6 ON when voltage V3=0. Phase L3→C4 starts, after phase C3→L3 ends, with immediate switch S5 OFF, and ends with switch S4 OFF when current I3 becomes zero. Delay in the start of the second phase results in a power loss due to actual loop resistance, and in a prolonged generated magnetic field while the coil current I3 lasts. Devices of FIG. 39 and FIG. 24 look similar, but are used differently. Expressions (29), (32), and (33) apply.

No transients occur at making a loop with a series coil, connecting an uncharged capacitor to points with zero voltage, removing one of two current routes, or breaking a loop at no current. A discharged capacitor and a coil with no current store no energy.

Thus no methodical energy loss occurs in any type of replenishing or a related backward process with shorting the storage capacitor when it becomes discharged. In a related backward process without shorting the storage capacitor a part of the energy remains in it, nevertheless it is only a negligible part because for a lower output voltage ripple a storage capacitor much bigger than a charged capacitor should be selected.

Each of process phases is a part of one period of the resonant frequency of the relevant loop so only EMI at those two resonant frequencies is generated during a replenishing and its related backward process.

Replenishing a Battery Charge

A rechargeable DC voltage source may be used instead of the storage capacitor. Anticipation of C3=∞ and the same polarity for voltages $V4_0$ and $V3_0$ in expression (23) yields a charging feasibility criterion $|V4_0| \geq 2 \cdot |V3_0|$. This is similar to the energy return criterion in a dosing device.

As in the replenishing, no methodical energy loss occurs and only EMI at the resonant frequencies of the relative loops is generated during a battery charging.

DC Power Supply Architecture

Power supplies transfer energy from a power source to a load. Dosing obtains energy from the input power source. Replenishing delivers energy to the load. In each cycle, depending on the input $V_{IN}$ and nominal output $V3_N$ voltage requirements, voltage raising and/or reversing may be needed after dosing and prior to replenishing.

Figure 40:
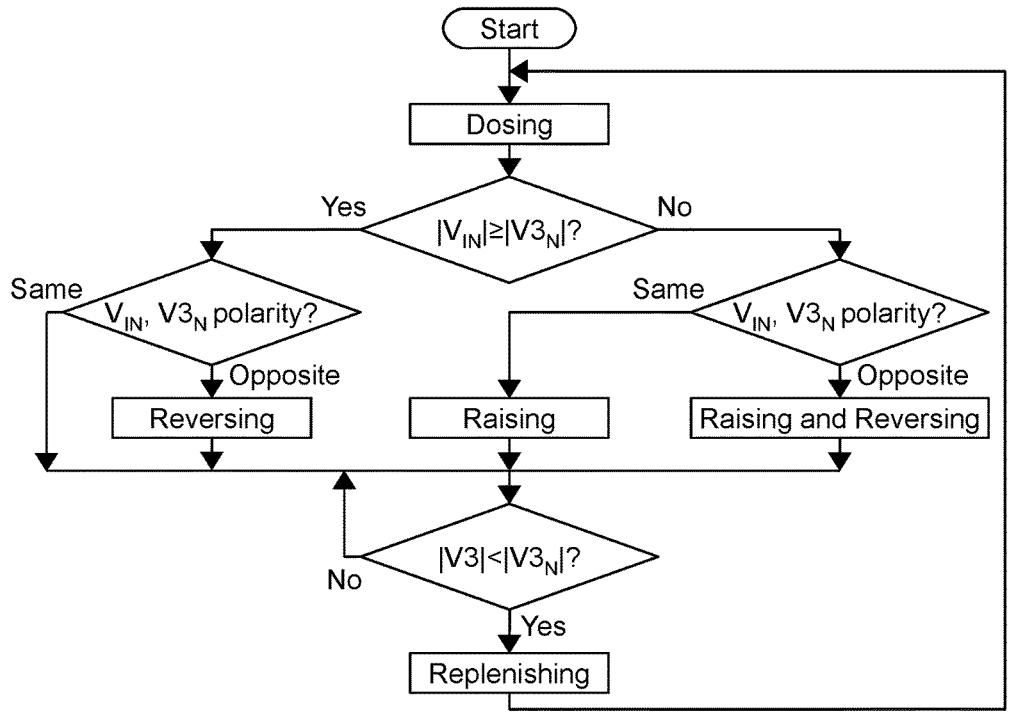
FIG. 40, showing a flowchart of power supply operation with checking a voltage level first as described herein.

The flowchart in FIG. 40 illustrates operation of a DC power supply and selection of the necessary basic processes to be used in it. After Start the operation is cyclical. Each cycle includes Dosing and Replenishing, and may also include Reversing, Raising, or Raising and Reversing. The cycles are repeated while modulus of the output voltage is below the required level ($|V3_N|$). This condition of repetition may be verified at any phase of the cycle, doing it just before the replenishing provides for timely correction and lower ripple of the output voltage. Selection of the necessary basic processes in each cycle is based on comparison of the modulus and the polarity of voltages $V_{IN}$ and $V3_N$. No additional process is necessary if $|V_{IN}| \geq |V3_N|$, and $V_{IN}$ and $V3_N$ have the same polarity. Reversing is necessary if $|V_{IN}| \geq |V3_N|$, and $V_{IN}$ and $V3_N$ have the opposite polarities. Raising is necessary if $|V_{IN}| < |V3_N|$ and $V_{IN}$ and $V3_N$ have the same polarity. Raising and Reversing is necessary if $|V_{IN}| < |V3_N|$ and $V_{IN}$ and $V3_N$ have the opposite polarities. Raising may be included even if not necessary.

Figure 41:
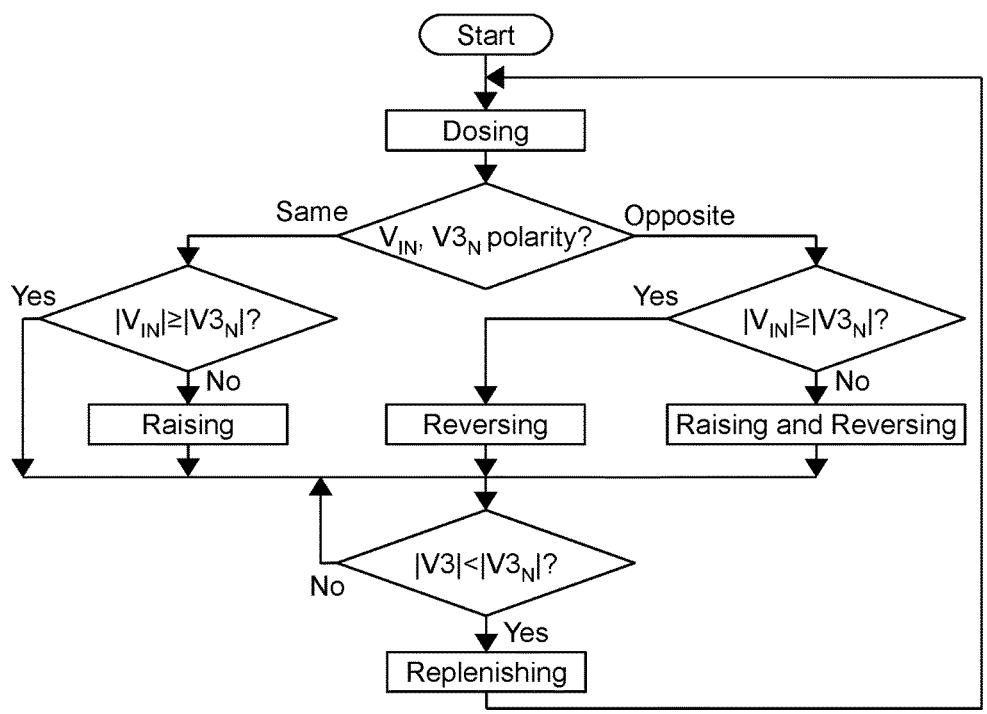
FIG. 41, showing a flowchart of power supply operation with checking a voltage polarity first as described herein.

The polarity check may precede the level check, as in the flowchart in FIG. 41; or both of them may be completed prior to processes selection, the criteria remain the same.

Raising may be included even if not necessary.

To use a power supply having no Reversing with an AC input voltage, the dosing should be performed only when voltages $V_{IN}$ and $V3_N$ have same polarity.

DC Power Supply Configurations

In all the following configurations, the name of each block reflects its function. Any presented above type of blocks may be used. Separate phases and processes may overlap in time when the relative active loops have no common capacitors or coils.

DC Power Supply without Voltage Raising

Figure 42:
FIG. 42, showing a functional diagram of a DC power supply as described herein.

The functional diagram in FIG. 42 comprises Dosing and Replenishing blocks.

Operational cycle begins with dosing and ends with replenishing. The dosing of a new cycle may overlap with the second phase of the replenishing of the previous cycle.

DC Power Supply with Voltage Raising

Figure 44:
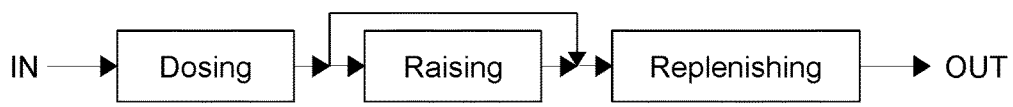
FIG. 44, showing a functional diagram of a DC power supply with voltage raising as described herein.

The functional diagram in FIG. 44 comprises Dosing, Raising, and Replenishing blocks. Operational cycle begins with dosing, may include raising, and ends with replenishing. Each raising termination may be selected to include reversing or not. A new cycle may begin after completion of the first phase of the raising of the previous cycle. The raising of a new cycle may overlap with the replenishing of the previous cycle if the first phase of the replenishing ends before the first phase of the raising ending.

The raising may be compulsory or selectable.

DC Power Supply with Multiple Outputs

Figure 45:
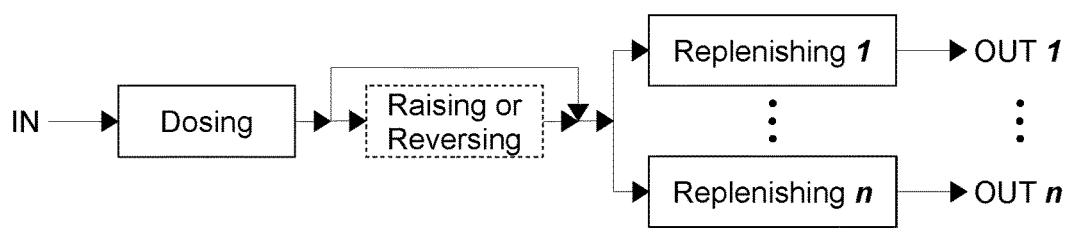
FIG. 45, showing a functional diagram of a multiple output DC power supply with common raising or reversing as described herein.

The functional diagram in FIG. 45 comprises a Dosing, n Replenishing (1 to n), and optionally (designated with a dotted line) a Raising or a Reversing block.

Figure 46:
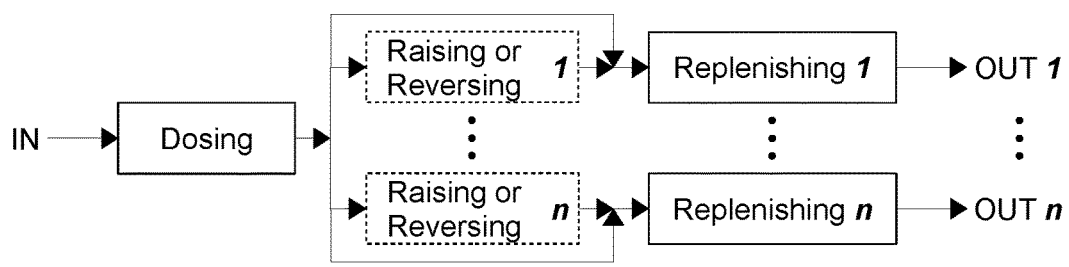
FIG. 46, showing a functional diagram of a multiple output DC power supply with separate raising or reversing as described herein.

The functional diagram in FIG. 46 comprises a Dosing, n Replenishing (1 to n), and optionally (designated with a dotted line) up to n Raising or Reversing (1 to n) blocks.

Figure 43:
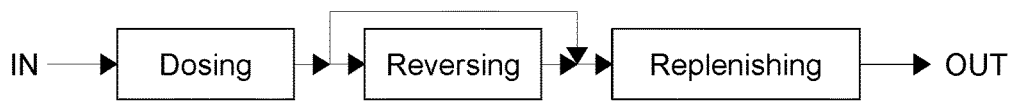
FIG. 43, showing a functional diagram of a DC power supply with voltage polarity reversing as described herein.

Operation of every chain from IN to OUT i (i=1, . . . , n) for FIG. 45 and FIG. 46 is as for FIG. 42, FIG. 43, or FIG. 44. Common resources (blocks Dosing, and Raising or Reversing) may not be used simultaneously for different outputs.

DC Power Supply with Multiple Inputs

Figure 47:
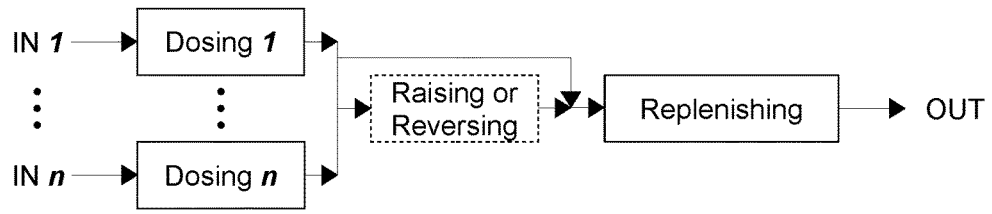
FIG. 47, showing a functional diagram of a multiple input DC power supply with common raising or reversing as described herein.

The functional diagram in FIG. 47 comprises n Dosing (1 to n), a Replenishing, and optionally (designated with a dotted line) a Raising or a Reversing blocks.

Figure 48:
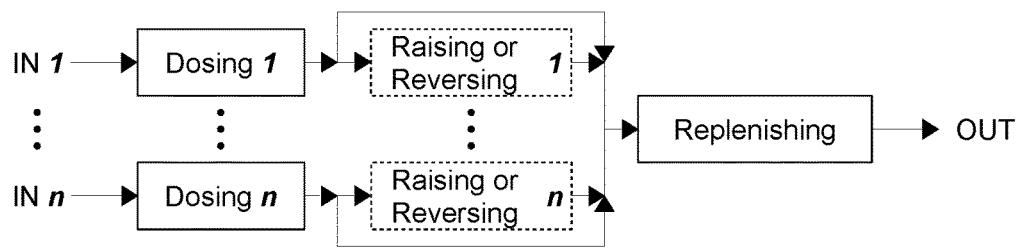
FIG. 48, showing a functional diagram of a multiple input DC power supply with separate raising or reversing as described herein.

The functional diagram in FIG. 48 comprises n Dosing (1 to n), a Replenishing, and optionally (designated with a dotted line) up to n Raising or Reversing blocks.

For FIG. 47 and FIG. 48, operation of every chain from IN i (i=1, . . . , n) to OUT is as for FIG. 42, or FIG. 43, or FIG. 44; Replenishing and Raising or Reversing (FIG. 47 only) may continue a cycle from one input at a time.

DC Power Supply with Isolation Between Input and Output

A power supply (FIG. 42, FIG. 43, or FIG. 44), with isolated Dosing (FIG. 8) and Replenishing (FIG. 34 or FIG.

37) devices, is in isolated mode, if input isolation and dosing switches are OFF when any of replenishing and output isolation switches is ON.

DC Power Supply with a Common Coil

Coils are relatively big in size. In all above power supplies same coil may be used in several processes through its controlled connection to the relative devices only. Use of a common coil enables reduction in size of a power supply. No overlapping of phases is possible for processes using the same coil.

Lossless Operation with a Negligible EMI

In all above processes, connection of the capacitors is done through a coil, shorting of the capacitors is done at a zero voltage, disconnection of the coils is done at a zero current, so no transient processes occur, and there is no residual energy in shorted or disconnected components. In every phase, the inductance and the capacitance of the active loop determine its resonant frequency, and only part of a single period of that frequency takes place during each operational cycle.

Actual losses can be caused only by controller consumption, a non-zero resistance of components and conductors, core losses in coils, a non-zero switching time, a capacitor leakage, and parasitic elements. As every operating cycle is performed on a per need basis, caused by a load consumption, the resulting efficiency equals to that of a single cycle and is independent of the power consumption. When feasible, the super conductance of conductors and coils eliminates part of remaining losses.

Switches

Reversing, raising, and energy return need bidirectional switches. MOSFET-based, IGBT-based, solid state, MEMS, electromagnetic, reed and other relay types can be used. Among the selection considerations are their ON resistance, switching time, control energy, and operating envelope.

Figure 49:
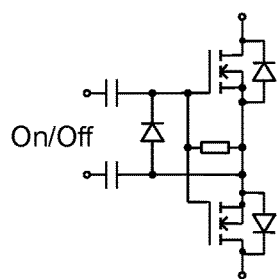
FIG. 49, showing a known MOSFET based controllable bidirectional switch.

A known switch design based on a pair of N-type MOSFET with a capacitively coupled On/Off gate control is shown in FIG. 49. It is bidirectional and can combine a low ON resistance, a high current capability, a fast response, and a wide operational envelope.

Coils

Use of coreless coils eliminates core losses and nonlinearity, thus preventing wide EMI spectrum. Use of toroidal coils significantly reduces magnetic interference. Use of a Litz wire or a flat conductor reduces or eliminates the skin effect impact. Use of Brooks coils provides for higher inductance to resistance ratio. Enclosing the coils in a p-metal shield reduces susceptibility to external magnetic fields.

Capacitors

Low leakage is desired for the storage capacitor, low ESR for the dosing and raising.

Reactive Components Values

For a higher power of a DC power supply more energy is to be transferred per a cycle meaning a bigger dosing capacitor C1. The cycle should be shorter meaning coils with lower inductance and smaller capacitors. For a lower output ripple the storage to the dosing capacitors C3/C1 ratio should be higher. For a higher output to input voltage $V3/V_{IN}$ ratio the dosing to the raising capacitors C1/C2 ratio should be higher. Typically values of capacitors are C3>>C1>C2. A too low coil inductance will result in higher losses due to the switches and the conductors resistance. Condition detection and switch control should be much faster than the shortest phase duration.

Controller

Control functions may be performed either by a common or by separate distributed means. Control logic may be implemented with any combination of hardware, firmware and software. Feasible types of the output voltage include fixed, selectable, adjustable, and programmable.

Figure 50:
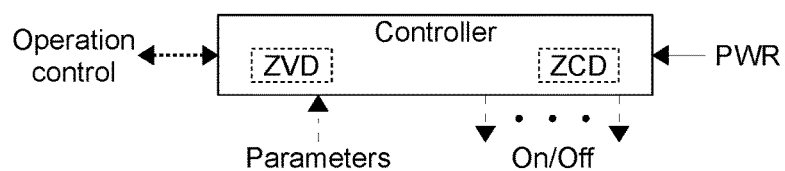
FIG. 50, showing a functional diagram of a power supply controller as described herein.

FIG. 50 shows interfaces of a general Controller with ZVD and ZCD. An optional Operation control for setting a mode and/or a performance is designated with a dotted line arrow. Component values and real time signals are coupled via Parameters inputs. Processes are controlled via On/Off outputs. In a specific controller, types and amount of interfaces correspond to actual power supply architecture. Feeding via PWR may initially be provided from a battery or another power source, and later also from the controlled supply itself, with a possible battery recharging.

Manufacturing Technologies

Basic devices and complete power supplies can be assembled from single components or manufactured with any level of integration using various manufacturing processes.

BEST MODES FOR CARRYING OUT THE INVENTION

The diagram in FIG. 42 can be implemented with any of 2 types of replenishing, isolated or not, with no, partial, or complete energy return, with a common or separate coils, which amounts to 2×2×3×2=12 combinations. The diagram in FIG. 43 can also have any of 2 types of reversing, thus amounting to 2×12=24 combinations. Compared to FIG. 42, the diagram in FIG. 44 can also have 5 coil usage options (3 separate, a common to dosing and reversing, a common to dosing and replenishing, a common to raising and replenishing, a single) and any of 4 types of raising, thus amounting to 4×5×12=240 combinations. Selection of method to detect the ending condition for each process phase separately increases amount of different configurations by orders of magnitude. Several representative preferred configurations are described in details. In all various embodiments, due to circuit configuration, the input terminal pair IN and the storage capacitor C3 never form part of a same loop.

With reference to FIG. 51 through FIG. 56, different embodiments of voltage converters to DC and/or DC power supplies, which implement some of the previously described principles, are now disclosed.

Figure 51:
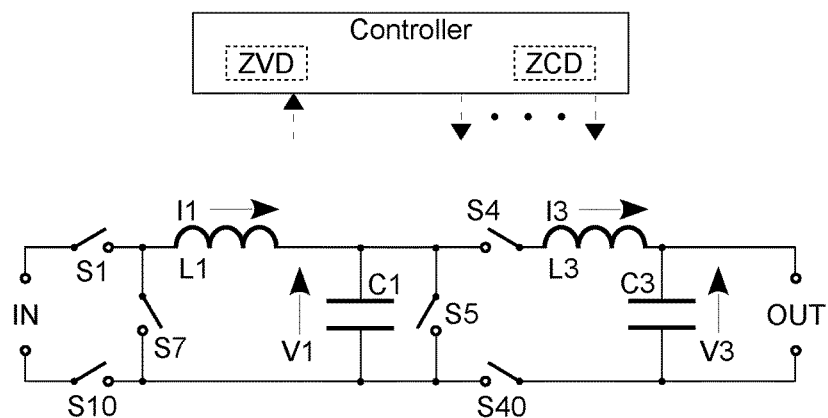
FIG. 51, showing a circuit diagram of an isolated power supply with voltage reversing, according to an embodiment of the present invention.

FIG. 51 exemplifies a DC power supply in accordance with configuration in FIG. 43. Here terminal pair IN, switches S1, S10, coil L1, and capacitor C1 form an isolated dosing device; switch S7, coil L1, and capacitor C1 form a type A reversing device; capacitors C1, C3, switches S4, S40, S5, and coil L3 form an isolated type B replenishing device; a terminal pair OUT is for a load connection, a controller with ZCD and ZVD controls the operation. Table A and Table B exemplify respectively operational cycle and energy return control in the isolated mode. For each phase the corresponding raw gives in respective columns preliminary conditions, how to start, what to include, when to end, and how to end. Phases IN→C1, C1→L1, and L1→C1 may overlap with L3→C3. For a non-isolated mode, switches S10 and S40 are ON at all times.

TABLE A

| Phase | Preconditions | Start with | Include | End on | End with |
|---|---|---|---|---|---|
| IN->C1 | all switches OFF, V1 = 0 | S1, S10 ON | I1 ≠ 0 | I1 = 0 | S1, S10 OFF |
| Reversing | all switches OFF | S7 ON | I1 ≠ 0 | I1 = 0 | S7 OFF |
| C1->L3, C3 | all switches OFF | S4, S40 ON | — | V1 = 0 | S5 ON |
| L3->C3 | C1->L3, C3 end | — | — | I3 = 0 | S4, S40 OFF |

TABLE B

| Phase | Preconditions | Start with | Include | End on | End with |
|---|---|---|---|---|---|
| C3->L3 | V1 = 0, S1, S10, S7, S4, S40 OFF, S5 ON | S4, S40 ON | — | V3 = 0 | S5 OFF |
| L3->C1, C3 | C3->L3 end | — | — | I3 = 0 | S4, S40 OFF |
| Reversing | all switches OFF | S7 ON | I1 ≠ 0 | I1 = 0 | S7 OFF |
| C1->L1, IN | Reversing/L3->C1, C3 end | S1, S10 ON | — | V1 = 0 | S5 ON |
| L1->IN | C1->L1, IN end | — | — | I1 = 0 | S1, S10 OFF |

Reversing is performed on a per cycle need basis; it enables generation of V3 opposite to the input voltage polarity, including operation with an AC input.

Figure 52:
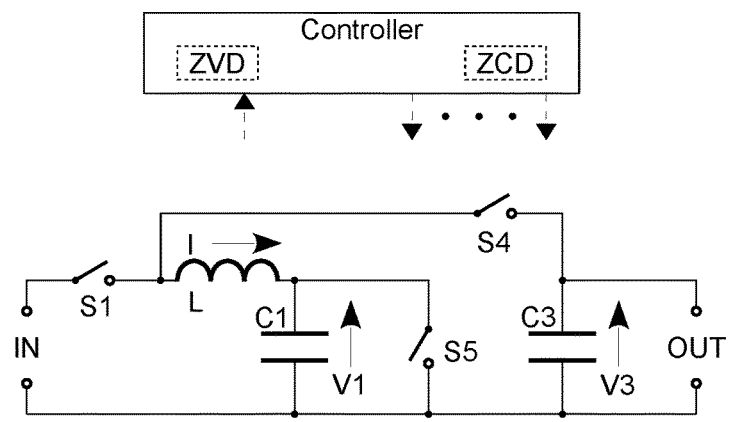
FIG. 52, showing a circuit diagram of a power supply with a common coil according to an embodiment of the present invention.

FIG. 52 exemplifies a DC power supply in accordance with configuration in FIG. 42 with a common coil. Here a terminal pair IN, a switch S1, a coil L, and a capacitor C1 form a dosing device; capacitors C1 and C3, switches S4 and S5, and coil L form a type A replenishing device; a terminal pair OUT is for a load connection. A controller with ZCD and ZVD controls the operation. Table C and Table D exemplify respectively operational cycle and energy return control for FIG. 52.

TABLE C

| Phase | Preconditions | Start with | Include | End on | End with |
|---|---|---|---|---|---|
| IN->C1 | S1, S4, S5 OFF, V1 = 0 | S1 ON | I ≠ 0 | I = 0 | S1 OFF |
| C1->L, C3 | S1, S4, S5 OFF, V1 ≠ 0 | S4 ON | — | V1 = 0 | S5 ON |
| L->C3 | C1->L, C3 end | — | — | I = 0 | S4 OFF |

TABLE D

| Phase | Preconditions | Start with | Include | End on | End with |
|---|---|---|---|---|---|
| C3->L | V1 = 0, S5 ON, S1, S4 OFF | S4 ON | — | V3 = 0 | S5 OFF |
| L->C1, C3 | C3->L end | — | — | I = 0 | S4 OFF |
| C1->L, IN | L->C1, C3 end | S1 ON | — | V1 = 0 | S5 ON |
| L->IN | C1->L, IN end | — | — | I = 0 | S1 OFF |

All the following figures exemplify a DC power supply in accordance with configuration in FIG. 44. Different than shown operation cycles and energy return control sequences are possible as well. The anticipated relative capacitor values are C3>C1>C2.

Figure 53:
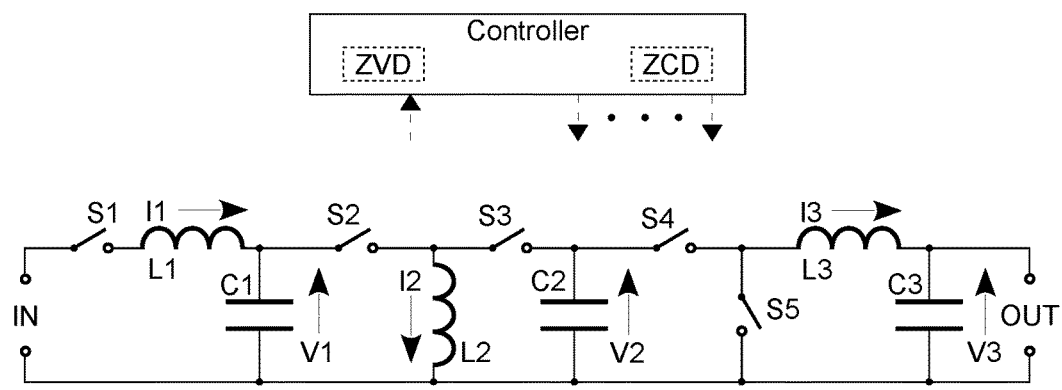
FIG. 53, showing a circuit diagram of a power supply with a type A voltage raising, according to an embodiment of the present invention.

In a DC power supply on FIG. 53 a terminal pair IN, a switch S1, a coil L1, and a capacitor C1 form a dosing device; capacitors C1 and C2, switches S2 and S3, and coil L2 form a type A raising device; capacitors C2 and C3, switches S4 and S5, and coil L3 form a type A replenishing device; a terminal pair OUT is for a load. A controller with ZCD and ZVD controls the operation. Table E and Table F exemplify respectively operational cycle and energy return control for FIG. 53. End of phases L2→C2 and C2→L2 depends on a per cycle need for reversing. The raising is compulsory.

TABLE E

| Phase | Preconditions | Start with | Include | End on | End with |
|---|---|---|---|---|---|
| IN->C1 | S1, S2 OFF, V1 = 0 | S1 ON | I1 ≠ 0 | I1 = 0 | S1 OFF |
| C1->L2 | S1, S2, S3 OFF, V1 ≠ 0 | S2 ON | S4 OFF | V1 = 0 | S3 ON |
| L2->C2 | C1->L2 end, V2 = 0, S4 OFF | S2 OFF | — | 1st or 2nd I2 = 0 | S3 OFF |

TABLE E-continued

| Phase | Preconditions | Start with | Include | End on | End with |
|---|---|---|---|---|---|
| C2->L3, C3 | S3, S4, S5 OFF, V2 ≠ 0 | S4 ON | — | V2 = 0 | S5 ON |
| L3->C3 | C2->L3, C3 end | — | S4 OFF | I3 = 0 | S5 OFF |

TABLE F

| Phase | Preconditions | Start with | Include | End on | End with |
|---|---|---|---|---|---|
| C3->L3 | all switches OFF, V3 ≠ 0, V1, V2 = 0 | S5 ON | S4 ON | V3 = 0 | S5 OFF |
| L3->C2, C3 | C3->L3 end | — | — | I3 = 0 | S4 OFF |
| C2->L2 | L3->C2, C3 end | S3 ON | S5 ON | $1^{st}$ or $2^{nd}$ V2 = 0 | S4, S2 ON |
| L2->C1 | C2->L2 end | S3 OFF | — | I2 = 0 | S2 OFF |
| C1->L1, IN | L2->C1 end | S1 ON | S3 ON | V1 = 0 | S2 ON |
| L1->IN | C1->L1, IN end | — | — | I1 = 0 | S1 OFF |

Figure 54:
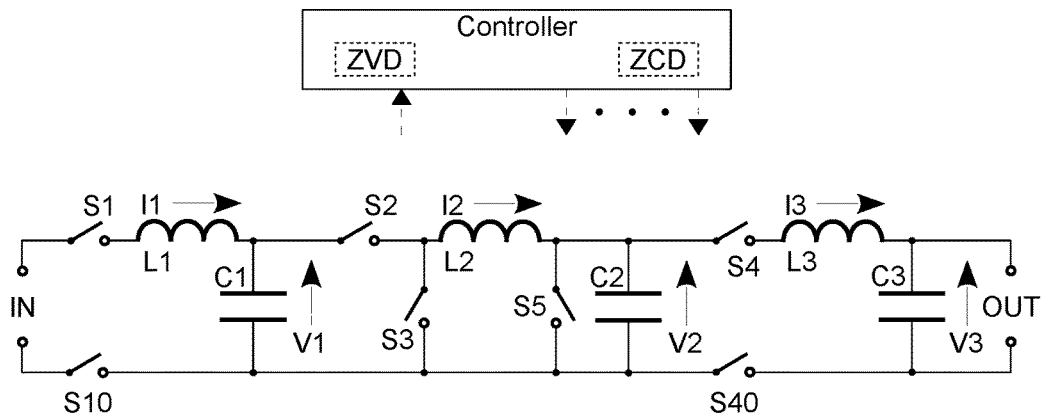
FIG. 54, showing a circuit diagram of an isolated power supply with a type B voltage raising, according to an embodiment of the present invention.

In a DC power supply on FIG. 54 a terminal pair IN, switches S1, S10, a coil L1, and a capacitor C1 form an isolated dosing device; capacitors C1, C2, switches S2, S3, S5, and coil L2 form a type B raising device; capacitors C2, C3, switches S5, S4, S40, and coil L3 form an isolated type B replenishing device; a terminal pair OUT is for a load connection. A controller with ZCD and ZVD controls the operation. Table G and Table H exemplify respectively operational cycle and energy return control for the non-isolated mode, with switches S10, S40 ON at all times. End of phases L2→C2 and C2→L2 depends on a per cycle need for reversing. The raising is compulsory.

In the isolated mode switches S10, S40 are as respectively S1, S4 at all times, in addition to Table G and Table H instructions.

TABLE G

| Phase | Preconditions | Start with | Include | End on | End with |
|---|---|---|---|---|---|
| IN->C1 | V1 = 0, S1, S2 OFF | S1 ON | I1 ≠ 0 | I1 = 0 | S1 OFF |
| C1->L2 | S1, S2, S3, S4 OFF, S5 ON, V1 ≠ 0, V2 = 0 | S2 ON | — | V1 = 0 | S3 ON |
| L2->C2 | C1->L2 end | S5 OFF | S2 OFF | $1^{st}$ or $2^{nd}$ I2 = 0 | S3 OFF |
| C2->L3, C3 | S2, S3, S4, S5 OFF, V2 ≠ 0 | S4 ON | — | V2 = 0 | S5 ON |
| L3->C3 | C2->L3, C3 end | — | — | I3 = 0 | S4 OFF |

TABLE H

| Phase | Preconditions | Start with | Include | End on | End with |
|---|---|---|---|---|---|
| C3->L3 | S1, S4 OFF, S5 ON, V1, V2 = 0, V3 ≠ 0 | S4 ON | S2, S3 OFF | V3 = 0 | S5 OFF |
| L3->C2, C3 | C3->L3 end | — | — | I3 = 0 | S4 OFF |
| C2->L2 | L3->C2, C3 end | S3 ON | S2 ON | $1^{st}$ or $2^{nd}$ V2 = 0 | S5 ON |
| L2->C1 | C2->L2 end | S3 OFF | — | I2 = 0 | S2 OFF |
| C1->L1, IN | L2->C1 end | S1 ON | S3 ON | V1 = 0 | S2 ON |
| L1->IN | C1->L1, IN end | — | — | I1 = 0 | S1 OFF |

Figure 55:
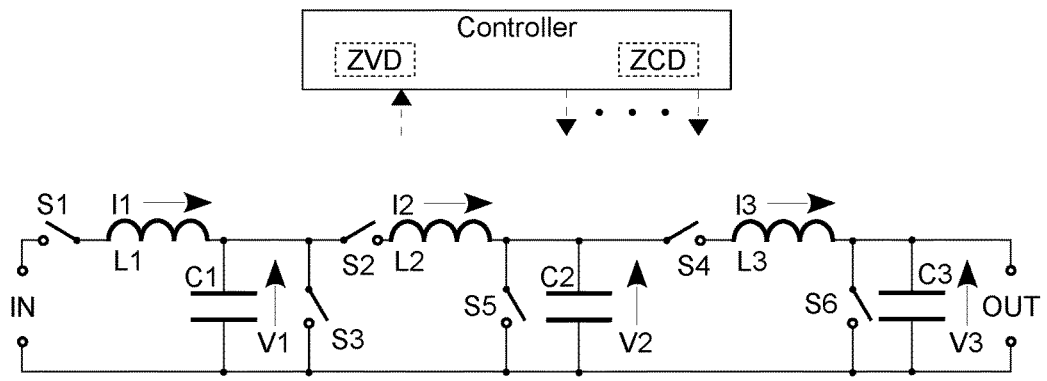
FIG. 55, showing a circuit diagram of a power supply with a type C voltage raising, according to an embodiment of the present invention.

In a DC power supply on FIG. 55 a terminal pair IN, a switch S1, a coil L1, and a capacitor C1 form a dosing device; capacitors C1, C2, switches S2, S3, S5, and coil L2 form a type C raising device; capacitors C2, C3, switches S5, S4, S6, and coil L3 form a type B replenishing device; a terminal pair OUT is for a load connection. A controller with ZCD and ZVD controls the operation. Table I and Table J exemplify respectively operational cycle and energy return control. End of phases L2→C2 and C2→L2 depends on a per cycle need for reversing. The raising is compulsory.

TABLE I

| Phase | Preconditions | Start with | Include | End on | End with |
|---|---|---|---|---|---|
| IN->C1 | V1 = 0, S1, S2, S3, S6 OFF | S1 ON | I1 ≠ 0 | I1 = 0 | S1 OFF |
| C1->L2 | S1, S2, S3, S4, S6 OFF, S5 ON, V1 ≠ 0, V2 = 0 | S2 ON | — | V1 = 0 | S3 ON |
| L2->C2 | C1->L2 end | S5 OFF | — | $1^{st}$ or $2^{nd}$ I2 = 0 | S2 OFF |
| C2->L3, C3 | S2, S4, S5, S6 OFF, V2 ≠ 0 | S4 ON | — | V2 = 0 | S5 ON |
| L3->C3 | C2->L3, C3 end | — | — | I3 = 0 | S4 OFF |

TABLE J

| Phase | Preconditions | Start with | Include | End on | End with |
|---|---|---|---|---|---|
| C3->L3 | S1, S2, S3, S4, S6 OFF, S5 ON, V1, V2 = 0, V3 ≠ 0 | S4 ON | — | V3 = 0 | S6 ON |
| L3->C2 | C3->L3 end | S5 OFF | S3 ON | I3 = 0 | S4 OFF |
| C2->L2 | L3->C2 end | S2 ON | — | $1^{st}$ or $2^{nd}$ V2 = 0 | S5 ON |
| L2->C1 | C2->L2 end | S3 OFF | — | I2 = 0 | S2 OFF |
| C1->L1, IN | L2->C1 end | S1 ON | — | V1 = 0 | S3 ON |
| L1->IN | C1->L1, IN end | — | — | I1 = 0 | S1 OFF |

Figure 56:
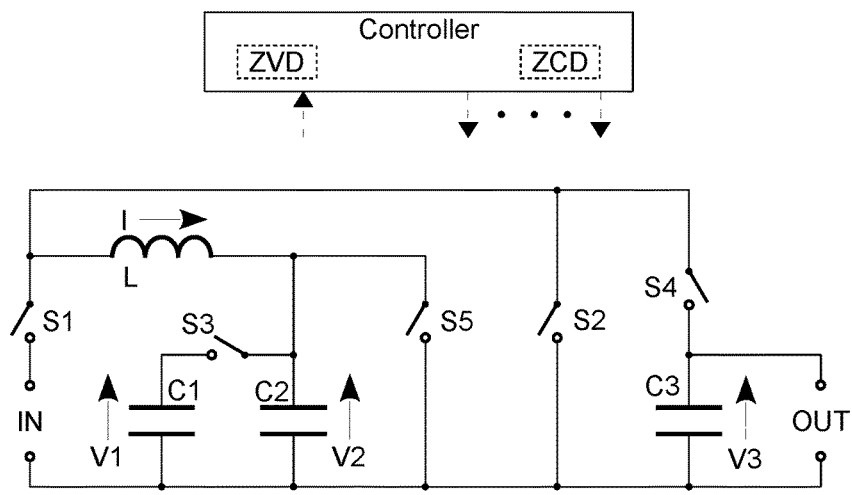
FIG. 56, showing a circuit diagram of a power supply with a type D voltage raising and a single coil, according to an embodiment of the present invention.

FIG. 56 exemplifies a DC power supply in accordance with configuration in FIG. 44 with a common coil. Here a terminal pair IN, switches S1 and S3, a coil L, and capacitors C1 and C2 form a dosing device; capacitors C1, C2, switches S2, S3, and coil L form a type D raising device; capacitors C2, C3, switches S5, S4, S2, and coil L form a type A replenishing device; a terminal pair OUT is for a load connection. A controller with ZCD and ZVD controls the operation. Table K and Table L exemplify respectively operational cycle and energy return control. End of phases L→C2 and L→C1,C2 depends on a per cycle need for reversing. The raising is selectable.

TABLE K

| Phase | Preconditions | Start with | Include | End on | End with |
|---|---|---|---|---|---|
| IN->C1, C2 | S1, S2, S4, S5 OFF, S3 ON, V1 = 0 | S1 ON | I ≠ 0 | I = 0 | S1 OFF |
| C1, C2->L | IN->C1, C2 end | S2 ON | — | V1 = 0 | S3 OFF |
| L->C2 | C1, C2->L end | — | — | $1^{st}$ or $2^{nd}$ I = 0 | S2 OFF |
| C2->L, C3 | L->C2 end | S4 ON | — | V2 = 0 | S5 ON |
| L->C3 | C2->L, C3 end | — | — | I = 0 | S4 OFF |

TABLE L

| Phase | Preconditions | Start with | Include | End on | End with |
|---|---|---|---|---|---|
| C3->L | S1, S2, S4 OFF, S3, S5 ON | S4 ON | — | V3 = 0 | S2 ON |
| L->C1, C2 | C3->L end | S5 OFF | S4 OFF | $1^{st}$ or $2^{nd}$ I = 0 | S2 OFF |
| C1, C2->L, IN | L->C1, C2 end | S1 ON | — | V1 = 0 | S5 ON |
| L->IN | C1, C2->L, IN end | — | — | I = 0 | S1 OFF |

Table M and Table N specify variations of its operational cycle without raising. Reversing is performed on a per cycle need basis.

TABLE M

| Phase | Preconditions | Start with | Include | End on | End with |
|---|---|---|---|---|---|
| IN->C2 | all switches OFF, V2 = 0 | S1 ON | I ≠ 0 | I = 0 | S1 OFF |
| Reversing | IN->C2 end | S2 ON | I ≠ 0 | I = 0 | S2 OFF |
| C2->L, C3 | IN->C2/Reversing end | S4 ON | — | V2 = 0 | S5 ON |
| L->C3 | C2->L, C3 end | — | — | I = 0 | S4 OFF |

TABLE N

| Phase | Preconditions | Start with | Include | End on | End with |
|---|---|---|---|---|---|
| IN->C1, C2 | S1, S2, S4, S5 OFF, S3 ON, V2 = 0 | S1 ON | I ≠ 0 | I = 0 | S1 OFF |
| Reversing | IN->C1, C2 end | S2 ON | I ≠ 0 | I = 0 | S2 OFF |
| C1, C2->L, C3 | IN->C1, C2/Reversing end | S4 ON | — | V2 = 0 | S5 ON |
| L->C3 | C1, C2->L, C3 end | — | — | I = 0 | S4 OFF |

In all various embodiments, the input terminal pair IN and the storage capacitor C3 are never in a same loop.

With the presently available components a full operational cycle duration <25 usec is feasible, shorter than standard industrial 50/60/400 Hz AC voltage periods by 2 to 3 orders of magnitude. Thus a standard AC input voltage would appear almost constant during the dosing which is a part of one operational cycle. Yet the invented method equally works with fast changing input voltages.

Figure 57:
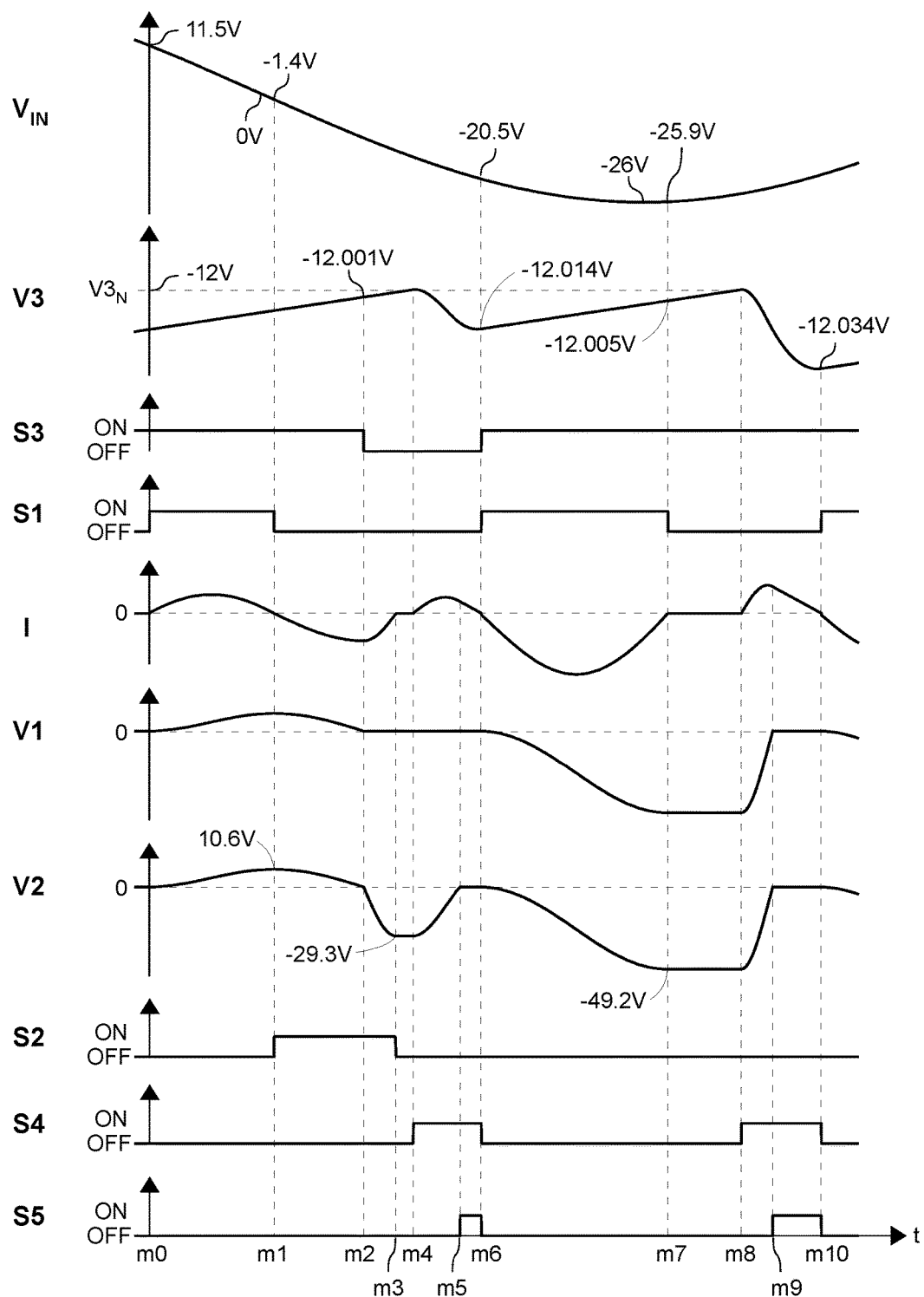
FIG. 57, showing simulated timing diagrams of operation of an embodiment of the present invention with an AC input.

FIG. 57 shows simulated timing diagrams for a device of FIG. 56 with the components C1=2 uF, C2=0.3 uF, C3=500 uF, L=6 uH, the nominal output voltage $V3_N=-12$ V, a constant load current of 0.5 A, and a 10 kHz AC input voltage $V_{IN}=26\cos(62832t)$. The graphs from top to bottom show respectively voltages $V_{IN}$, V3, state of switches S3, S1, current I, voltages V1, V2, state of switches S2, S4, S5, with a common time axis t; m0÷m10 designate control decision moments for two consecutive operational cycles:

m0—Switch S1 ON starts dosing, voltage $V_{IN}$=11.5V results into a current I>0.

m1—On I=0 dosing ends with S1 OFF. $V_{IN}$ passed 0V, now $V_{IN}$=-1.4V. V1=V2=10.6V i.e. opposite to $V3_N$ and too low for replenishing, according to the criterion (23). Switch S2 ON starts raising with polarity reverse.

m2—Voltages become V1=V2=0, switch S3 OFF disconnects the C1.

m3—On I=0, capacitor C2 is charged to voltage V2=-29.3V of same polarity as $V3_N$, so raising ends with switch S2 OFF. The output voltage V3=-12.001V.

m4—Due to the load current, V3 passes $V3_N$ level, switch S4 ON starts replenishing.

m5—On V2=0 switch S5 ON shorts capacitor C2, replenishing continues since I≠0.

m6—On I=0, switch S4 OFF ends replenishing, C3 becomes charged to V3=-12.014V, $V_{IN}$=-20.5V, S5 OFF and S1, S3 ON start another dosing.

m7—On I=0 dosing ends with S1 OFF. After passing -26V, $V_{IN}$=-25.9V. V1=V2=-49.2V is sufficient for the replenishing. The output voltage V3=-12.005V.

m8—Due to the load current, V3 passes $V3_N$ level, switch S4 ON starts replenishing.

m9—On V2=0 switch S5 ON shorts capacitor C2, replenishing continues since I≠0.

m10—On I=0, switch S4 OFF ends replenishing, C3 becomes charged to V3=-12.034V, S5 OFF and S1, S3 ON start another dosing.

Besides DC power supplies and converters, another advantageous application is in energy harvesting devices, by raising a very low primary voltage to a desired level with further complete energy transfer to a storage capacitor or a rechargeable battery.

Another advantageous application is utilization of almost all the energy stored in a double-layer capacitor (called as well supercapacitor or ultracapacitor).

Unused energy return to a power source is particularly advantageous in a battery operated equipment with a low operation duty cycle, e.g. in an implanted device the low frequency RF inductive communication system is activated for only 0.005% of its lifetime (about 4 hours out of 9 years).

The multiple output configurations may supply the own need of the controller after the start of operation.

LIST OF REFERENCE SIGNS
IN THE ALPHABETICAL ORDER

| Sign | Designated feature |
|---|---|
| C1 | Dosing capacitor |
| C2 | Raising capacitor |
| C3 | Storage capacitor |
| C4 | A capacitor |
| I | Current in coil L |
| I1 | Current in coil L1 |
| $I1_{rtn}$ | End I1 value in C1->L1, IN |
| $I1_{ex}$ | Extremum of I1 |
| I2 | Current in coil L2 |
| $I2_{ex}$ | Extremum of I2 |
| I3 | Current in coil L3 |
| $I3_{end}$ | End value of I3 in C4->L3, C3 |
| I4 | Current in coil L4 |
| $I4_{ex}$ | Extremum of I4 |
| IN | Input terminal pair |
| L | Common coil |
| L1 | Dosing coil |
| L2 | Raising coil |
| L3 | Replenishing coil |
| L4 | Reversing coil |
| OUT | Output terminal pair |
| S1 | Dosing switch |
| S10 | Input isolation switch |
| S11 | Switch |
| S2 | Discharging switch |
| S3 | Raising switch |
| S4 | Replenishing switch |
| S40 | Output isolation switch |
| S41 | A switch |
| S5 | Shorting switch |
| S6 | Bypassing switch |
| S7 | Reversing switch |
| S8 | A switch |
| S80 | A switch |
| S9 | A switch |
| S90 | A switch |
| t | Time variable |
| t0 | Duration of reversing |
| t1 | Duration of dosing |
| t2 | Duration of phase C1->L2 |
| t3 | Duration of phase L2->C2 |
| t4 | Duration of phase C4->L3, C3 |
| t5 | Duration of phase L3->C3 |
| t6 | Duration of phase C3->L3 |
| t7 | Duration of phase L3->C4 |
| t8 | Duration of phase C1->L1, IN |
| t9 | Duration of phase L1->IN |
| V1 | Voltage across C1 |
| $V1_0$ | Initial value of V1 |
| $V1_{ex}$ | Extremum of V1 |
| V2 | Voltage across C2 |
| $V2_{ex}$ | Extremum of V2 |
| V3 | Voltage across C3 |
| $V3_0$ | Initial value of V3 |
| $V3_{end}$ | End V3 value in C4->L3, C3 |
| $V3_N$ | Nominal output V3 |
| V4 | Voltage across C4 |
| $V4_0$ | Initial value of V4 |

-continued

LIST OF REFERENCE SIGNS
IN THE ALPHABETICAL ORDER

| Sign | Designated feature |
|---|---|
| $V4_{rtn}$ | End V4 value in L3->C4, C3 |
| $V_{IN}$ | Input voltage |
| ZCD | Zero current detection |
| ZVD | Zero voltage detection |

The invention claimed is:

1. A method of energy transfer between a storage capacitor and a voltage source, the method comprising at least one of:
 a charging mode, comprising, while a modulus of a voltage across the storage capacitor being less than a modulus of a nominal voltage, cycling through:
  (a) making a first loop comprising a dosing coil, a dosing capacitor, and an input terminal pair connected to the voltage source, wherein the dosing coil, the dosing capacitor, and the input terminal pair are connected in series with each other;
  (b) detecting a condition of a current in the dosing coil becoming non-zero;
  (c) detecting a condition of the current in the dosing coil becoming substantially zero, thereupon breaking the first loop;
  (d) making a second loop comprising the dosing capacitor, a replenishing coil, and the storage capacitor, wherein the dosing capacitor, the replenishing coil, and the storage capacitor are connected in series with each other;
  (e) detecting a condition of a voltage across the dosing capacitor becoming substantially zero, thereupon making a third loop comprising the storage capacitor and the replenishing coil and breaking the second loop; and
  (f) detecting a condition of a current in the replenishing coil becoming substantially zero, thereupon breaking the third loop; and
 an uncharging mode, comprising:
  (g) making a third loop comprising the storage capacitor and a replenishing coil;
  (h) then detecting a condition of a voltage across the storage capacitor becoming substantially zero, thereupon:
   making a second loop comprising a dosing capacitor, the replenishing coil, and the storage capacitor, wherein the dosing capacitor, the replenishing coil, and the storage capacitor are connected in series with each other; and
   breaking the third loop;
  (i) then detecting a condition of a current in the replenishing coil becoming substantially zero, thereupon breaking the second loop;
  (j) then making a first loop comprising a dosing coil, the dosing capacitor, and an input terminal pair connected to the voltage source, wherein the dosing coil, the dosing capacitor, and the input terminal pair are connected in series with each other;
  (k) then detecting a condition of a voltage across the dosing capacitor becoming substantially zero, thereupon shorting the dosing capacitor; and
  (l) then detecting a condition of a current in the dosing coil becoming substantially zero, thereupon breaking the first loop.

2. The method according to claim 1, further comprising using a common coil for both the dosing coil and the replenishing coil.

3. The method according to claim 1, further comprising:
 isolating the storage capacitor from the dosing capacitor during steps (a) through (c) and during steps (j) through (l) using a first switch coupled between a first terminal of the storage capacitor and the dosing capacitor and a second switch coupled between a second terminal of the storage capacitor and the dosing capacitor; and
 isolating the input terminal pair from the dosing capacitor during steps (d) through (f) and during steps (g) through (i) using a third switch coupled between a first terminal of the input terminal pair and the dosing capacitor and a fourth switch coupled between a second terminal of the input terminal pair and the dosing capacitor.

4. The method according to claim 1, further comprising:
 between steps (c) and (d):
  comparing a polarity of the voltage across the dosing capacitor to a polarity of the nominal voltage; and
  reversing the voltage across the dosing capacitor, if the polarity of the voltage across the dosing capacitor is opposite to the polarity of the nominal voltage; and
 between steps (i) and (j):
  comparing the polarity of the voltage across the dosing capacitor to a polarity of an input voltage across the input terminal pair; and
  reversing the voltage across the dosing capacitor, if the polarity of the voltage across the dosing capacitor is opposite to the polarity of the input voltage;
 wherein reversing the voltage across the dosing capacitor comprises:
  making a fourth loop comprising the dosing coil and the dosing capacitor;
  then detecting the condition of the current in the dosing coil becoming non-zero; and
  then detecting the condition of the current in the dosing coil becoming substantially zero, thereupon breaking the fourth loop.

5. The method according to claim 1, further comprising:
 between steps (c) and (d):
  comparing a polarity of the voltage across the dosing capacitor to a polarity of the nominal voltage; and
  interchanging terminals of the dosing capacitor if the polarity of the voltage across the dosing capacitor is opposite to the polarity of the nominal voltage; and
 between steps (i) and (j):
  comparing the polarity of the voltage across the dosing capacitor to a polarity of an input voltage across the input terminal pair; and
  interchanging terminals of the dosing capacitor if the polarity of the voltage across the dosing capacitor is opposite to the polarity of the input voltage.

6. A method of energy transfer between a storage capacitor and a voltage source, the method comprising at least one of:
 a charging mode, comprising, while a modulus of a voltage across the storage capacitor being less than a modulus of a nominal voltage, cycling through:
  (a) making a first loop comprising a dosing coil, a dosing capacitor, and an input terminal pair connected to the voltage source, wherein the dosing coil, the dosing capacitor, and the input terminal pair are connected in series with each other;
  (b) detecting a condition of a current in the dosing coil becoming non-zero;

(c) detecting a condition of the current in the dosing coil becoming substantially zero, thereupon breaking the first loop;

(d) making a second loop comprising the dosing capacitor and a raising coil;

(e) detecting a condition of a voltage across the dosing capacitor becoming substantially zero, thereupon making a third loop comprising the raising coil and a raising capacitor and breaking the second loop;

(f) detecting a condition of the nominal voltage and a voltage across the raising capacitor having a same polarity and a current in the raising coil becoming substantially zero, thereupon breaking the third loop;

(g) making a fourth loop comprising the raising capacitor, a replenishing coil, and the storage capacitor, wherein the raising capacitor, the replenishing coil, and the storage capacitor are connected in series with each other;

(h) detecting a condition of the voltage across the raising capacitor becoming substantially zero, thereupon making a fifth loop comprising the replenishing coil and the storage capacitor and breaking the fourth loop; and (i) detecting a condition of a current in the replenishing coil becoming substantially zero, thereupon breaking the fifth loop; and an uncharging mode, comprising:

(j) making a fifth loop comprising a replenishing coil and the storage capacitor;

(k) then detecting a condition of a voltage across the storage capacitor becoming substantially zero, thereupon making a fourth loop comprising a raising capacitor, the replenishing coil, and the storage capacitor, wherein the raising capacitor, the replenishing coil, and the storage capacitor are connected in series with each other, and breaking the fifth loop;

(l) then detecting a condition of a current in the replenishing coil becoming substantially zero, thereupon breaking the fourth loop;

(m) then making a third loop comprising a raising coil and the raising capacitor;

(n) then detecting a condition of a voltage across the raising capacitor becoming substantially zero, thereupon making a second loop comprising a dosing capacitor and the raising coil and breaking the third loop;

(o) then detecting a condition of a current in the raising coil becoming substantially zero and an input voltage across an input terminal pair connected to the voltage source and a voltage across the dosing capacitor having a same polarity, thereupon breaking the second loop;

(p) then making a first loop comprising a dosing coil, the dosing capacitor, and the input terminal pair, wherein the dosing coil, the dosing capacitor, and the input terminal pair are connected in series with each other;

(q) then detecting a condition of the voltage across the dosing capacitor becoming substantially zero, thereupon shorting the dosing capacitor; and (r) then detecting a condition of a current in the dosing coil becoming substantially zero, thereupon breaking the first loop.

7. The method according to claim 6, further comprising using a common coil for at least two of the dosing coil, the raising coil, and the replenishing coil.

8. The method according to claim 6, further comprising:
making a parallel connection of the dosing capacitor with the raising capacitor in steps (a) and (n); and
breaking said parallel connection in step (e).

9. The method according to claim 6, further comprising:
isolating the storage capacitor from the dosing capacitor during steps (a) through (c) and during steps (p) through (r) using a first switch coupled between a first terminal of the storage capacitor and the dosing capacitor and a second switch coupled between a second terminal of the storage capacitor and the dosing capacitor; and
isolating the input terminal pair from the dosing capacitor during steps (d) through (i) and during steps (j) through (o) using a third switch coupled between a first terminal of the input terminal pair and the dosing capacitor and a fourth switch coupled between a second terminal of the input terminal pair and the dosing capacitor.

10. A device for energy transfer between a storage capacitor and a voltage source, the device comprising:
a dosing coil;
a dosing capacitor;
a replenishing coil;
an input terminal pair for connection to the voltage source;
a plurality of switches; and
a controller; wherein:
(a) the plurality of switches are coupled to the input terminal pair, the dosing capacitor, the storage capacitor, the dosing coil, and the replenishing coil and are configured to make and to break:
a first loop comprising the input terminal pair, the dosing coil, and the dosing capacitor, wherein the input terminal pair, the dosing coil, and the dosing capacitor are connected in series with each other;
a second loop comprising the dosing capacitor, the replenishing coil, and the storage capacitor, wherein the dosing capacitor, the replenishing coil, and the storage capacitor are connected in series with each other; and
a third loop comprising the replenishing coil and the storage capacitor;
(b) the controller is coupled to said first, second, and third loops and is configured to detect:
a first condition of a current in the dosing coil becoming non-zero;
a second condition of the current in the dosing coil becoming substantially zero;
a third condition of a voltage across the dosing capacitor becoming substantially zero;
a fourth condition of a current in the replenishing coil becoming substantially zero; and
a fifth condition of a modulus of a voltage across the storage capacitor being less than a modulus of a nominal voltage; and
(c) the controller is operably coupled to the plurality of switches and configured to control said plurality of switches according to said first, second, third, fourth, and fifth conditions.

11. The device according to claim 10, wherein the dosing coil and the replenishing coil are a common coil.

12. The device according to claim 10, wherein:
the plurality of switches are further configured to short and unshort the dosing capacitor; and
the controller is further configured to detect a condition of the voltage across the storage capacitor becoming substantially zero and to control the plurality of switches according to said condition.

13. The device according to claim 10, wherein:
the plurality of switches are further configured to provide (i) isolation of the input terminal pair from the dosing capacitor and (ii) isolation of the storage capacitor from the dosing capacitor; and
the controller is further configured to maintain at least one of (i) and (ii) at all times.

14. The device according to claim 10, wherein:
the plurality of switches are further configured to make and to break a loop comprising the dosing capacitor and the dosing coil; and
the controller is further configured:
to detect at least one of (i) a condition of a polarity of the voltage across the dosing capacitor being opposite to a polarity of the nominal voltage and (ii) a condition of the polarity of the voltage across the dosing capacitor being opposite to a polarity of an input voltage across the terminal pair; and
to control the plurality of switches according to said at least one of (i) and (ii).

15. The device according to claim 10, wherein:
the plurality of switches are further configured to interchange terminals of the dosing capacitor; and
the controller is further configured:
to detect at least one of (i) a condition of a polarity of the voltage across the dosing capacitor being opposite to a polarity of the nominal voltage and (ii) a condition of the polarity of the voltage across the dosing capacitor being opposite to a polarity of an input voltage across the input terminal pair; and
to control the plurality of switches according to said at least one of (i) and (ii).

16. A device for energy transfer between a storage capacitor and a voltage source, the device comprising:
a dosing coil;
a dosing capacitor;
a raising coil;
a raising capacitor;
a replenishing coil;
an input terminal pair for connection to the voltage source;
a plurality of switches; and
a controller: wherein:
(a) the plurality of switches are coupled to the input terminal pair, the dosing capacitor, the raising capacitor, the storage capacitor, the dosing coil, the raising coil, and the replenishing coil and are configured to make and to break:
a first loop comprising the input terminal pair, the dosing coil, and the dosing capacitor, wherein the input terminal pair, the dosing coil, and the dosing capacitor are connected in series with each other;
a second loop comprising the dosing capacitor and the raising coil;
a third loop comprising the raising coil and the raising capacitor;
a fourth loop comprising the raising capacitor, the replenishing coil, and the storage capacitor, wherein the raising capacitor, the replenishing coil, and the storage capacitor are connected in series with each other; and
a fifth loop comprising the replenishing coil and the storage capacitor;
(b) the controller is coupled to said first, second, third, fourth, and fifth loops and is configured to detect:
a first condition of a current in the dosing coil becoming non-zero;
a second condition of the current in the dosing coil becoming substantially zero;
a third condition of a voltage across the dosing capacitor becoming substantially zero:
a fourth condition of a current in the raising coil becoming substantially zero;
a fifth condition of a voltage across the raising capacitor becoming substantially zero;
a sixth condition of a polarity of the voltage across the raising capacitor being opposite to a polarity of a nominal voltage;
a seventh condition of a current in the replenishing coil becoming substantially zero; and
an eighth condition of a modulus of a voltage across the storage capacitor being less than a modulus of the nominal voltage; and
(c) the controller is operably coupled to the plurality of switches, and configured to control said plurality of switches according to said first, second, third, fourth, fifth, sixth, seventh, and eighth conditions.

17. The device according to claim 16, wherein at least two of the dosing coil, the raising coil, and the replenishing coil are a common coil.

18. The device according to claim 16, wherein in the first and second loops the raising capacitor is connected in parallel with the dosing capacitor.

19. The device according to claim 16, wherein:
the plurality of switches are further configured to short and unshort the dosing capacitor; and
the controller is further configured:
to detect (i) a condition of the voltage across the storage capacitor becoming substantially zero and (ii) a condition of the voltage across the dosing capacitor and an input voltage across the input terminal pair having a same polarity; and
to control the plurality of switches according to said (i) and (ii).

20. The device according to claim 16, wherein:
the plurality of switches are further configured to provide (i) isolation of the input terminal pair from the dosing capacitor and (ii) isolation of the storage capacitor from the raising capacitor; and
the controller is further configured to maintain at least one of (i) and (ii) at all times.

* * * * *

UNITED STATES PATENT AND TRADEMARK OFFICE
CERTIFICATE OF CORRECTION

PATENT NO. : 9,793,807 B2
APPLICATION NO. : 15/073690
DATED : October 17, 2017
INVENTOR(S) : Boris Ablov Page 1 of 1

It is certified that error appears in the above-identified patent and that said Letters Patent is hereby corrected as shown below:

In the Specification

Column 14 immediately after Line 29, insert the following:
-- DC power supply with voltage reversing
The functional diagram in Fig. 43 comprises Dosing, Reversing and Replenishing blocks. Operational cycle begins with dosing, may include reversing, and ends with replenishing. The dosing and the reversing of a new cycle may overlap with the second phase of the replenishing of the previous cycle. --

Column 15 Line 50, "p-metal" should be -- µ-metal --.

Column 24 Line 50, "to" should be -- t0 --.

In the Claims

Column 25 Line 61 (Claim 1), ":" should be -- ; --;

Column 25 Line 65 (Claim 1), "(I)" should be -- (l) --.

Column 26 Line 7 (Claim 3), "(I)" should be -- (l) --.

Signed and Sealed this
Twenty-seventh Day of March, 2018

Andrei Iancu
*Director of the United States Patent and Trademark Office*